US011653225B2

(12) United States Patent
Choi et al.

(10) Patent No.: US 11,653,225 B2
(45) Date of Patent: May 16, 2023

(54) POSITIONING TECHNIQUES USING POSITIONING REFERENCE SIGNALING

(71) Applicant: QUALCOMM Incorporated, San Diego, CA (US)

(72) Inventors: Chang-Sik Choi, Seoul (KR); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/345,183

(22) Filed: Jun. 11, 2021

(65) Prior Publication Data

US 2022/0007206 A1 Jan. 6, 2022

Related U.S. Application Data

(60) Provisional application No. 63/047,211, filed on Jul. 1, 2020.

(51) Int. Cl.
| | |
|---|---|
| *H04W 16/28* | (2009.01) |
| *H04L 5/00* | (2006.01) |
| *H04W 74/08* | (2009.01) |
| *H04W 24/10* | (2009.01) |
| *H04W 4/40* | (2018.01) |
| *H04L 27/26* | (2006.01) |

(52) U.S. Cl.
CPC ........... *H04W 16/28* (2013.01); *H04L 5/0051* (2013.01); *H04L 27/2607* (2013.01); *H04W 4/40* (2018.02); *H04W 24/10* (2013.01); *H04W 74/0816* (2013.01)

(58) Field of Classification Search
CPC ....... H04W 16/28; H04W 4/40; H04W 24/10; H04W 4/025; H04B 7/088
See application file for complete search history.

(56) References Cited

U.S. PATENT DOCUMENTS

| | | | |
|---|---|---|---|
| 2012/0040696 A1* | 2/2012 | Siomina ................ G01S 5/0268 |
| | | | 455/456.6 |
| 2012/0165053 A1* | 6/2012 | Yoon ..................... H04L 5/0048 |
| | | | 455/501 |
| 2016/0309490 A1* | 10/2016 | Huang ................ H04W 72/542 |
| 2018/0077529 A1* | 3/2018 | Ryu ..................... H04W 64/006 |
| 2019/0230618 A1* | 7/2019 | Saur ..................... H04W 56/001 |

(Continued)

OTHER PUBLICATIONS

3GPP R1-2003668; Title: Evaluation of DL-AoD technique under IIoT Scenario; Source: MediaTek; Date: May 25-Jun. 5, 2020, pp. 1-7. (Year: 2020).*

(Continued)

*Primary Examiner* — Fahmida S Chowdhury
(74) *Attorney, Agent, or Firm* — Qualcomm/Norton Rose Fulbright US LLP

(57) ABSTRACT

In some implementations, a method of wireless communication includes transmitting, from an initiator of a positioning reference signal (PRS) group to other members of the PRS group, an indication of access to a wireless channel for the PRS group. The method further includes broadcasting a first PRS via each antenna beam of a plurality of antenna beams. An antenna array of the initiator is configured to communicate via the plurality of antenna beams. Other aspects and features are also claimed and described.

30 Claims, 9 Drawing Sheets

(56) References Cited

U.S. PATENT DOCUMENTS

| | | | |
|---|---|---|---|
| 2021/0112522 A1* | 4/2021 | Kim | H04W 64/006 |
| 2021/0320769 A1* | 10/2021 | Cha | G01S 5/06 |
| 2022/0140880 A1* | 5/2022 | Cha | H04W 72/23 375/262 |
| 2022/0191878 A1* | 6/2022 | Yu | H04B 7/0695 |
| 2022/0272731 A1* | 8/2022 | Cha | H04J 13/0025 |
| 2022/0279367 A1* | 9/2022 | Hwang | H04L 5/0048 |

OTHER PUBLICATIONS

International Search Report and Written Opinion—PCT/US2021/037176—ISA/EPO—dated Sep. 29, 2021.

Mediatek: "Evaluation of DL-AoD technique under IIoT Scenario", 3GPP TSG RAN WG1 Meeting #101-e, 3GPP Draft, R1-2003668, 3rd Generation Partnership Project (3GPP), Mobile Competence Centre, 650, Route Des Lucioles, F-06921 Sophia-Antipolis Cedex, France, vol. RAN WG1, No. E-meeting, May 25, 2020-Jun. 5, 2020, 7 Pages, May 16, 2020 (May 16, 2020), XP051885443, Retrieved from the Internet: URL: https://ftp.3gpp.org/tsg_ran/WG1_RL1/TSGR1_101-e/Docs/R1-2003668.zip R1-2003668 Evaluation of DL-AoD technique under IIoT Scenario final.docx [retrieved on May 16, 2020] Section 3.

Spreadtrum Communications: "Discussion on NR Sidelink Physical Layer Structure", 3GPP Draft, 3GPP TSG RAN WG1 Ad-Hoc Meeting 1901, R1-1900713 Discussion on NR Sidelink Physical Layer Structure, 3rd Generation Partnership Project (3GPP), Mobile Competence Centre, 650, Route Des Lucioles, F-06921 Sophia-Antipolis Cedex, vol. RAN WG1, No. Taipei, Jan. 20, 2019-Jan. 25, 2019, Jan. 20, 2019 (Jan. 20, 2019), XP051593560, 10 Pages, Retrieved from the Internet: URL: http://www.3gpp.org/ftp/Meetings%5F3GPP%5FSYNC/RAN1/Docs/R1%2D1900713%2Ezip [retrieved on Jan. 20, 2019] Section 2.6.3, pp. 1-3, 2.1 Sidelink BWP p. 3, 2.2. Resource pool pp. 8-9, CSI Measurement and Reporting.

* cited by examiner

POSITIONING TECHNIQUES USING POSITIONING REFERENCE SIGNALING

CROSS-REFERENCE TO RELATED APPLICATIONS

This application claims the benefit of U.S. Provisional Patent Application No. 63/047,211, entitled, "POSITIONING TECHNIQUES USING POSITIONING REFERENCE SIGNALING," filed on Jul. 1, 2020, which is expressly incorporated by reference herein in its entirety.

TECHNICAL FIELD

Aspects of the present disclosure relate generally to wireless communication systems, and more particularly, to positioning techniques using positioning reference or other like signaling.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

One technology area that is gaining in popularity is wireless communication network access for vehicles. For examples, UEs may be integrated into vehicles (or components thereof), such as "smart cars," to support vehicle functionality such as automatic driving, navigation assistance, and remote device control. To enable positioning services at a vehicle which may be in motion, the vehicle may exchange one or more wireless signals (e.g., positioning reference signals (PRSs), or the like) with a nearby wireless device, such as, e.g., a roadside unit (RSU). As wireless communication networks advance, many wireless communication networks are being configured for communications in the millimeter wave (mmWave) spectrum. Due to differences between the mmWave spectrum and lower frequencies, conventional positioning techniques (e.g., for vehicles or the like) may be less successful when the signaling is performed in the mmWave spectrum.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting, from an initiator of a positioning reference signal (PRS) group to other members of the PRS group, an indication of access to a wireless channel for the PRS group. The method further includes broadcasting a first PRS via each antenna beam of a plurality of antenna beams. An antenna array of the initiator is configured to communicate via the plurality of antenna beams.

In an additional aspect of the disclosure, an apparatus configured for wireless communication is disclosed. The apparatus includes at least one processor, and a memory coupled to the at least one processor. The at least one processor is configured to transmit, from an initiator of a positioning reference signal (PRS) group to other members of the PRS group, an indication of access to a wireless channel for the PRS group. The at least one processor is further configured to broadcast a first PRS via each antenna beam of a plurality of antenna beams. An antenna array of the initiator is configured to communicate via the plurality of antenna beams.

In an additional aspect of the disclosure, an apparatus configured for wireless communication is disclosed. The apparatus includes means for transmitting, from an initiator of a positioning reference signal (PRS) group to other members of the PRS group, an indication of access to a wireless channel for the PRS group. The apparatus further includes means for broadcasting a first PRS via each antenna beam of a plurality of antenna beams. An antenna array of the initiator is configured to communicate via the plurality of antenna beams.

In an additional aspect of the disclosure, a non-transitory computer-readable medium stores instructions that, when executed by a processor, cause the processor to perform operations. The operations include transmitting, from an initiator of a positioning reference signal (PRS) group to other members of the PRS group, an indication of access to a wireless channel for the PRS group. The operations further include broadcasting a first PRS via each antenna beam of a plurality of antenna beams. An antenna array of the initiator is configured to communicate via the plurality of antenna beams.

In an additional aspect of the disclosure, a method of wireless communication includes receiving, at a responder of a positioning reference signal (PRS) group from an initiator of the PRS group, an indication of access to a wireless channel for the PRS group. The method also includes receiving, from the initiator, a broadcast of a first PRS. The method includes determining whether any other member of the PRS group is scheduled for PRS broadcasts before the responder. The method further include broadcasting, via each antenna beam of one or more antenna beams, a second PRS based on a determination that no other member of the PRS group is scheduled for broadcasts before the responder. An antenna array of the responder is configured to communicate via the one or more antenna beams.

In an additional aspect of the disclosure, an apparatus configured for wireless communication is disclosed. The apparatus includes at least one processor, and a memory coupled to the at least one processor. The at least one processor is configured to receive, at a responder of a positioning reference signal (PRS) group from an initiator of the PRS group, an indication of access to a wireless channel for the PRS group. The at least one processor is also configured to receive, from the initiator, a broadcast of a first PRS. The at least one processor is configured to determine whether any other member of the PRS group is scheduled for PRS broadcasts before the responder. The at least one processor is further configured to broadcast, via each antenna beam of one or more antenna beams, a second PRS based on a determination that no other member of the PRS group is scheduled for broadcasts before the responder. An antenna array of the responder is configured to communicate via the one or more antenna beams.

In an additional aspect of the disclosure, an apparatus configured for wireless communication is disclosed. The apparatus includes means for receiving, at a responder of a positioning reference signal (PRS) group from an initiator of the PRS group, an indication of access to a wireless channel for the PRS group. The apparatus also includes means for receiving, from the initiator, a broadcast of a first PRS. The apparatus includes means for determining whether any other member of the PRS group is scheduled for PRS broadcasts before the responder. The apparatus further includes means for broadcasting, via each antenna beam of one or more antenna beams, a second PRS based on a determination that no other member of the PRS group is scheduled for broadcasts before the responder. An antenna array of the responder is configured to communicate via the one or more antenna beams.

In an additional aspect of the disclosure, a non-transitory computer-readable medium stores instructions that, when executed by a processor, cause the processor to perform operations. The operations include receiving, at a responder of a positioning reference signal (PRS) group from an initiator of the PRS group, an indication of access to a wireless channel for the PRS group. The operations also include receiving, from the initiator, a broadcast of a first PRS. The operations include determining whether any other member of the PRS group is scheduled for PRS broadcasts before the responder. The operations further include broadcasting, via each antenna beam of one or more antenna beams, a second PRS based on a determination that no other member of the PRS group is scheduled for broadcasts before the responder. An antenna array of the responder is configured to communicate via the one or more antenna beams.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects or uses may come about via integrated chip implementations and other non-module-component based devices (e.g., end-user devices, vehicles, communication devices, computing devices, industrial equipment, retail devices, purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders, summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow chart of an example of a method for sequentially broadcasting a PRS via multiple antenna beams of a UE according to some aspects of the present disclosure.

DETAILED DESCRIPTION

Figure 1:
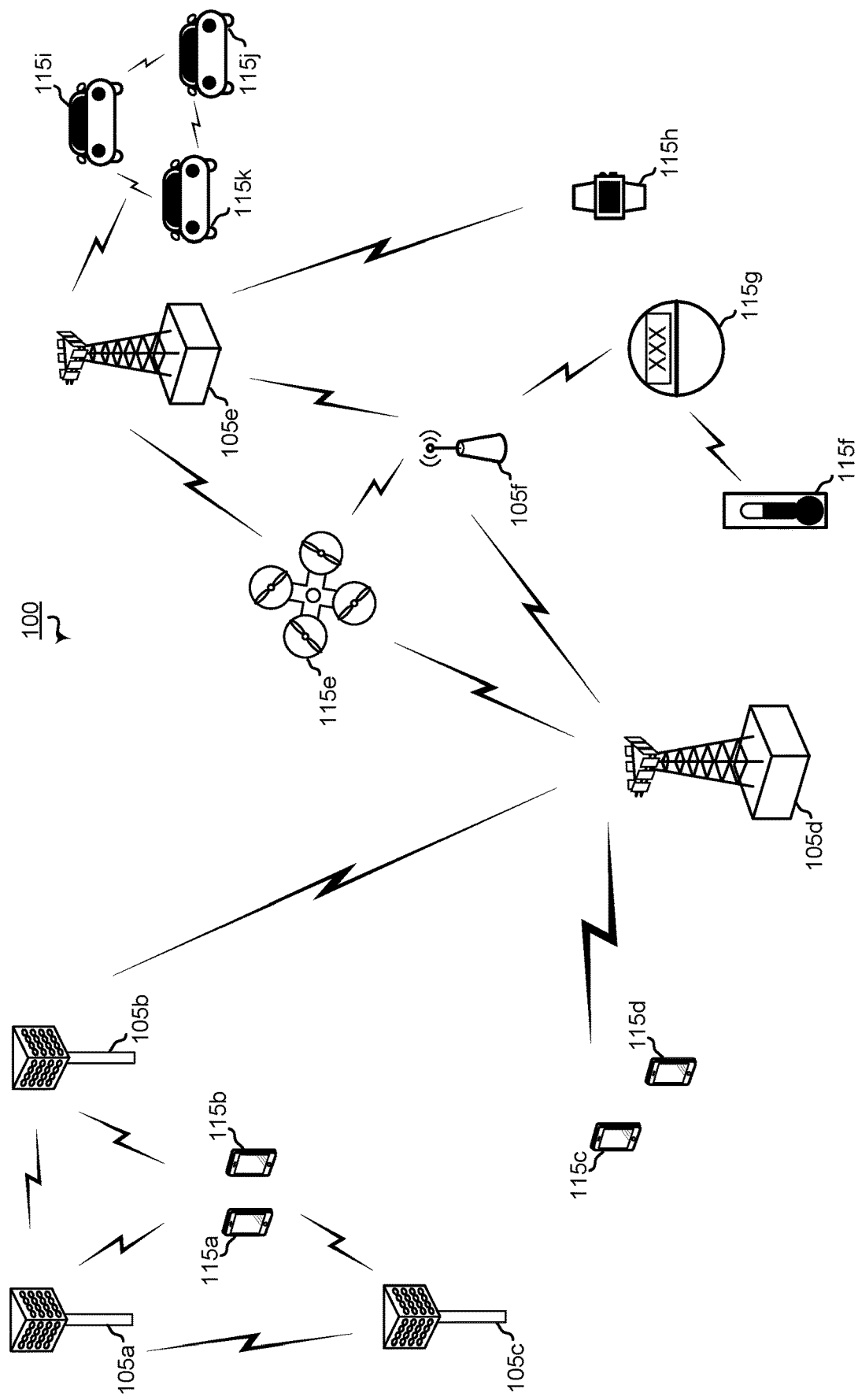
FIG. 1 is a block diagram illustrating details of an example of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The electromagnetic spectrum is often subdivided, based on frequency/wavelength, into various classes, bands, channels, etc. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band or spectrum in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media for supporting positioning reference signal (PRS)-based positioning using directional communication beams. For example, the present disclosure describes design of a PRS-based positioning process, including group formation, listen-before-transmit (LBT) sequencing, and PRS broadcast ordering and timing, that may be performed by devices that communicate using directional communication beams (as compared to omni-directional communication beams). The techniques of the present disclosure may, for example, support PRS-based positioning by vehicles configured for wireless communications in the sub-6 GHz spectrum, the millimeter wave (mmWave) spectrum (e.g., at frequencies greater than 30 gigahertz (GHz), such as between 30-300 GHz), or both.

To illustrate, in an example implementation, one or more vehicles (e.g., a user equipment (UE) integrated within each vehicle, or components thereof) and one or more roadside units (RSUs) may form a PRS group based on geographic proximity. One member of the group may be assigned the role of initiator, or may take the role of initiator by virtue of forming the PRS group. Other group member(s) are assigned the role of responders. As described further herein, roles within the PRS group may be assigned in various manners, such as by higher level signaling, based on fixed locations of the respective devices, based on accuracy of determined or estimated positions of the respective devices, or based on other characteristics. The initiator may perform a LBT procedure to gain access to a wireless communication channel for the PRS group, and may indicate channel access to the other members of the group. Responder devices may each transmit a number of antenna beams (e.g., directional antenna beams) supported at the respective responder device, and the initiator may determine a PRS broadcast sequence and a channel occupancy time (CoT) for the PRS group. The PRS broadcast sequence may indicate a sequence (e.g., an order) in which members of the PRS group are scheduled to broadcast a respective PRS, and the CoT may be based on the total number of antenna beams supported by the PRS group. The initiator may transmit the PRS broadcast sequence, the CoT, and the number of antenna beams supported by each member of the PRS group to the other members of the PRS group.

A RSU within the PRS group may receive an indicator of channel access and the other PRS group information, and, based on being identified as first in the PRS broadcast sequence, broadcast a first PRS via each antenna beam of a plurality of antenna beams supported by the RSU (e.g., the RSU includes an antenna array configured to communicate via the plurality of antenna beams). In some implementations, the RSU may sequentially broadcast the first PRS via each antenna beam of the plurality of antenna beams. For example, the RSU may broadcast the first PRS via a first antenna beam, followed by broadcasting (e.g., rebroadcasting) the first PRS via a second antenna beam, followed by broadcasting the first PRS by each remaining antenna beam sequentially. The RSU may be configured to broadcast the first PRS via each of the antenna beams using a same sequence but a different cyclic shift, such that receiving devices are able to identify which broadcast (or rebroadcast) of the first PRS is received based on the cyclic shift of the received broadcast. As used herein, broadcasting may refer to transmission of signals or information to all wireless communication devices within a particular communication range or within a broadcast group, such as a PRS group, and transmitting may refer to transmission of signals or information to a particular wireless communication device or a particular plurality of wireless communication devices.

Each vehicle (e.g., each UE), and any other RSUs, of the PRS group may subsequently sequentially broadcast a corresponding PRS via one or more antenna beams, based on an order associated with the vehicle in the PRS broadcast sequence. For example, a vehicle (e.g., a UE) may receive the indication of channel availability and the additional channel information from the initiator, and subsequently, may receive a broadcast of the first PRS from the RSU. The vehicle may wait until determining that no other member of the PRS group is scheduled for PRS broadcasts before the vehicle. For example, the vehicle may determine if a most recently received PRS broadcast (e.g., the broadcast of the first PRS) is received from a PRS group member that is immediately before the vehicle in the PRS broadcast sequence and, if so, that the PRS group member has completed PRS broadcasting based on a cyclic shift associated with the most recently received PRS broadcast and a number of antenna beams associated with the PRS group member. After such a determination, the vehicle may sequentially broadcast a second PRS via one or more antenna beams supported by an antenna array of the vehicle. The remaining PRS group members may similarly sequentially broadcast a respective PRS via one or more respective antenna beams. Although an RSU in this example is described as being first in the PRS broadcast sequence, in other implementations, a vehicle may be first in the PRS broadcast sequence, such as if the PRS group is formed without any RSUs.

After completion of PRS broadcasts by all members of the PRS group, timing data may be exchanged between the RSU and the vehicles to enable estimation of positions of the vehicles. In some implementations, the RSU may receive timing information from the vehicles, estimate positions of the vehicles based on the timing information and timing measured at the RSU, and transmit the estimated positions to the vehicles. In some other implementations, the vehicles may receive timing information from the RSU and estimate a respective relative position based on the timing information and timing measured at the vehicles. The RSU (or the vehicles) may provide timing information for each broadcast of the respective PRS, so that the vehicles (or the RSU) may estimate the position based on accurate timing information.

Particular implementations of the subject matter described in this disclosure can be implemented to realize one or more of the following potential advantages. In some aspects, the present disclosure provides techniques for supporting PRS-based positioning using directional communication beams. For example, devices may be grouped into a PRS group and may take turns sequentially broadcasting a respective PRS via one or more antenna beams supported by the respective device. After completion of all scheduled PRS broadcasts, the devices may exchange timing information that indicates timing of each broadcast of the respective PRS, which may enable position estimation based on accurate timing information. In this manner, penetration or coverage issues of PRSs due to beam directionality are compensated for by the techniques disclosed herein. Thus, the disclosed techniques may enable PRS-based positioning by vehicles configured to communicate in the mmWave spectrum.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices, purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g. radio frequency (RF)-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
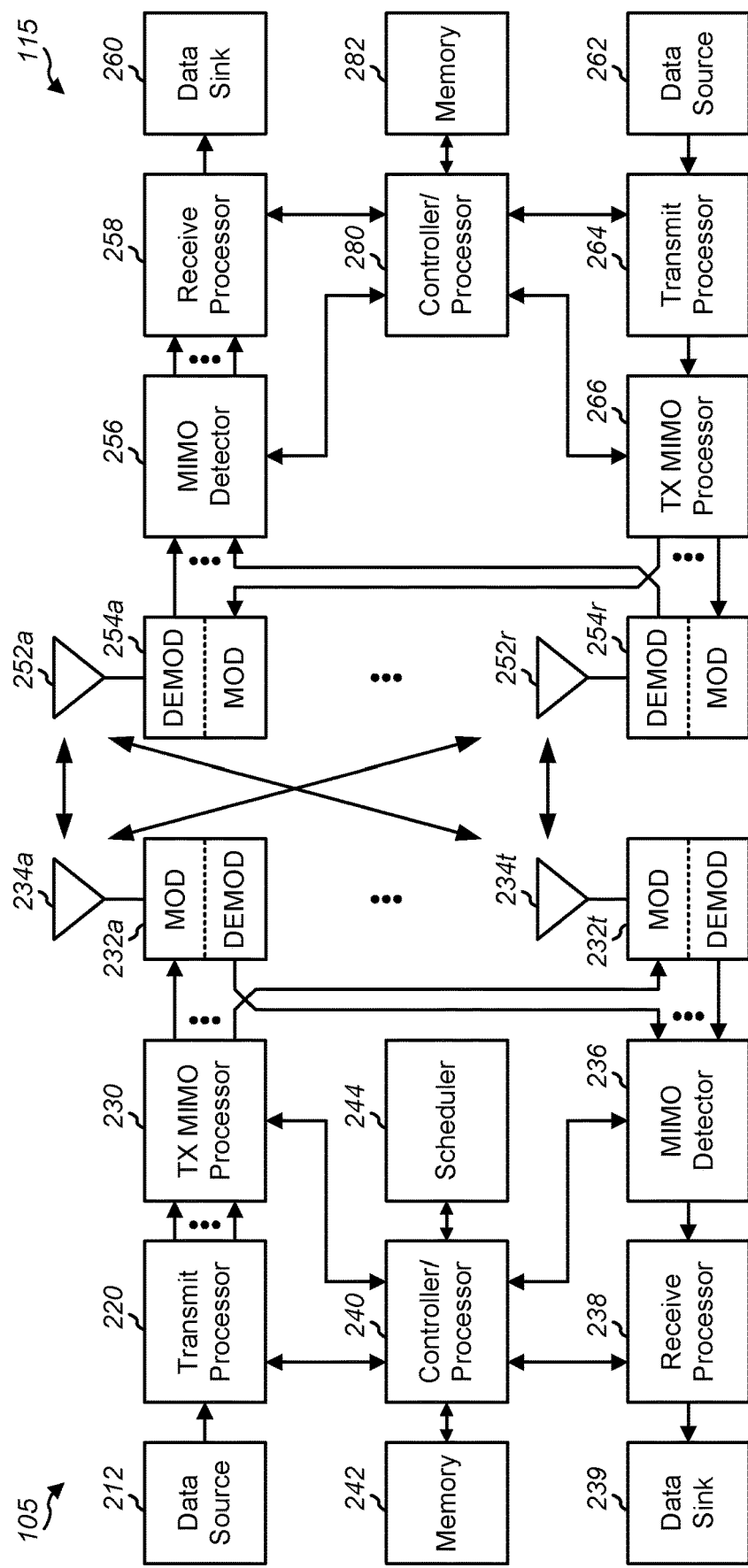
FIG. 2 is a block diagram conceptually illustrating an example of a design of a base station and a UE configured according to some aspects of the present disclosure.

FIG. 2 shows a block diagram conceptually illustrating an example design of a base station 105 and a UE 115 according to one or more aspects, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
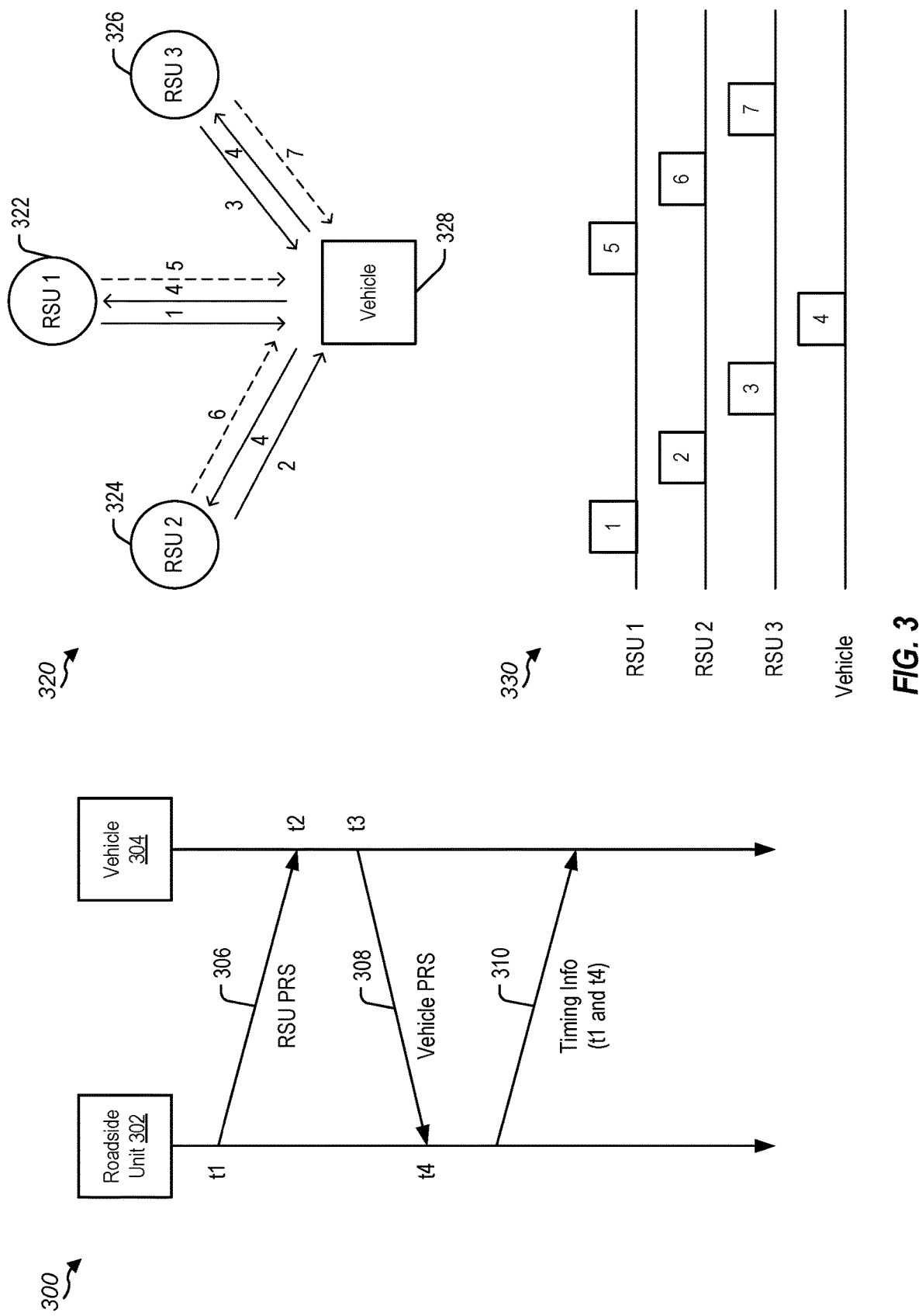
FIG. 3 includes multiple diagrams illustrating a first example of determining a position of a vehicle using a positioning reference signal (PRS) scheme according to some aspects of the present disclosure.

FIG. 3 includes multiple diagrams illustrating a first example of determining a position of a vehicle using a positioning reference signal (PRS) scheme according to some aspects of the present disclosure. The examples described with reference to FIG. 3 correspond to a sidelink (SL) based (SL-b) positioning scheme in which each vehicle estimates or computes a respective position (e.g., location) in a distributed manner. The example described with reference to FIG. 4 corresponds to a sidelink-assisted (SL-a) positioning scheme in which a fixed device, such as a roadside unit (RSU) or a server, estimates or computes the positions of the vehicles on their behalf.

Both types of SL positioning schemes use a round-trip time (RTT)-based approach that includes three phases. In phase 1, RSU(s) and vehicles are grouped. In some implementations, the grouping may be performed at an upper layer (e.g., by higher layer signaling). In phase 2, the RSU(s) and the vehicles may perform listen before transmit (LBT) procedures and broadcast respective PRSs. In some implementations, such as if the devices are communicating in the unlicensed spectrum, group LBT may be performed. For example, an initiator of the group (either a RSU or a UE) performs a LBT procedure to gain access to a wireless communication channel for the group. After the LBT procedure, the RSU(s) and the vehicles each broadcast a respective PRS. In phase 3, post-PRS messaging may be communicated between the RSU(s) and the vehicles. The post-PRS message may, for example, include timing information, measured clock error noise standard deviation, speed of the vehicles, clock drift standard deviation, innovation measurements, position data, clock data, or a combination thereof. Either the RSU(s) or the vehicles share timing information, and the other device estimates or computes the position of the vehicles, based on whether SL-b positioning or SL-a positioning is being performed. For example, for an SL-b positioning scheme, a RSU may transmit timing information including a departure time of an RSU PRS and an arrival time of a vehicle PRS to a vehicle, and the vehicle may estimate or compute the position of the vehicle. Alternatively, for an SL-a positioning scheme, a vehicle may transmit timing information including a departure time of a vehicle PRS and an arrival time of an RSU PRS to an RSU, and the RSU may estimate or compute the position of the vehicle and transmit position data to the vehicle.

FIG. 3 includes a ladder diagram 300 illustrating operations performed by a roadside unit (RSU) 302 and a vehicle 304 according to a SL-b positioning scheme. Although RSU 302 is described in FIG. 3, in other implementations, RSU 302 may be replaced with a server, such as a server-location client function (S-LCF).

RSU 302 may broadcast a first PRS (e.g., an RSU PRS) to vehicle 304, at 306. RSU 302 may measure a departure time t1 of the first PRS from RSU 302, and vehicle 304 may measure an arrival time t2 of the first PRS at vehicle 304. Based on receiving the first PRS, vehicle 304 may broadcast a second PRS (e.g., a vehicle PRS) to RSU 302, at 308. Vehicle 304 may measure a departure time t3 of the second PRS from vehicle 304, and RSU 302 may measure an arrival time t4 of the second PRS at RSU 302. In some implementations, the first PRS and the second PRS may be broadcast via the unlicensed spectrum. After PRS broadcasts are complete, RSU 302 may transmit timing information to vehicle 304, at 310. The timing information may include t1 (e.g., the departure time of the first PRS from RSU 302) and t4 (e.g., the arrival time of the second PRS at RSU 302). In some implementations, the timing information is communicated via a vehicle-to-everything (V2X) communication or an Intelligent Transport Systems (ITS)-G5 communication, as non-limiting examples. Vehicle 304 may estimate or compute a position and, in some implementations, a clock error, based on the timing information. For example, vehicle 304 may estimate the position using a Kalman filter, or another time-series based technique, as non-limiting examples. In some implementations, vehicle 304 may estimate the position based on the following equation:

$$z_n = (t_4 - t_3) + (t_2 - t_1) = \frac{\|r - x(t_n)\|}{v_{light}} + \alpha$$

where $z_n$ is the round-trip time, $x(t_n)$ is the position at time n, $v_{light}$ is the speed of light, and $\alpha$ is a constant weighing factor.

FIG. 3 also includes a block diagram 320 of messages communicated between each of a first RSU 322 ("RSU 1"), a second RSU 324 ("RSU 2"), and a third RSU 326 ("RSU 3"), and a vehicle 328 according to a SL-b positioning scheme. To illustrate, first RSU 322 may broadcast a first PRS ("1") to vehicle 328, second RSU 324 may broadcast a second PRS ("2") to vehicle 328, and third RSU 326 may broadcast a third PRS ("3") to vehicle 328. After receiving PRSs 1-3, vehicle 328 may broadcast a fourth PRS ("4") to each of first RSU 322, second RSU 324, and third RSU 326. Each RSU may then transmit timing information, including respective t1 and t4 measurements, to vehicle 328. For example, first RSU 322 may transmit first timing information ("6") to vehicle 328, second RSU 324 may transmit second timing information ("7") to vehicle 328, and third RSU 326 may transmit third timing information ("8") to vehicle 328. Vehicle 328 may estimate or compute a position based on timing information 6-8, as described above.

FIG. 3 also includes a timing diagram 330 indicating timing of signals 1-8 described with reference to block diagram 320. In a SL-b positioning scheme, PRS broadcasts may be performed by each device in a sequential order. For example, first RSU 322 may broadcast the first PRS ("1"), followed by second RSU 324 broadcasting the second PRS ("2"), followed by third RSU 326 broadcasting the third PRS ("3"), followed by vehicle 328 broadcasting the fourth PRS ("4"). After receipt of the fourth PRS, each of the RSUs 322-326 may transmit respective timing information to vehicle 328 in the same order.

Figure 4:
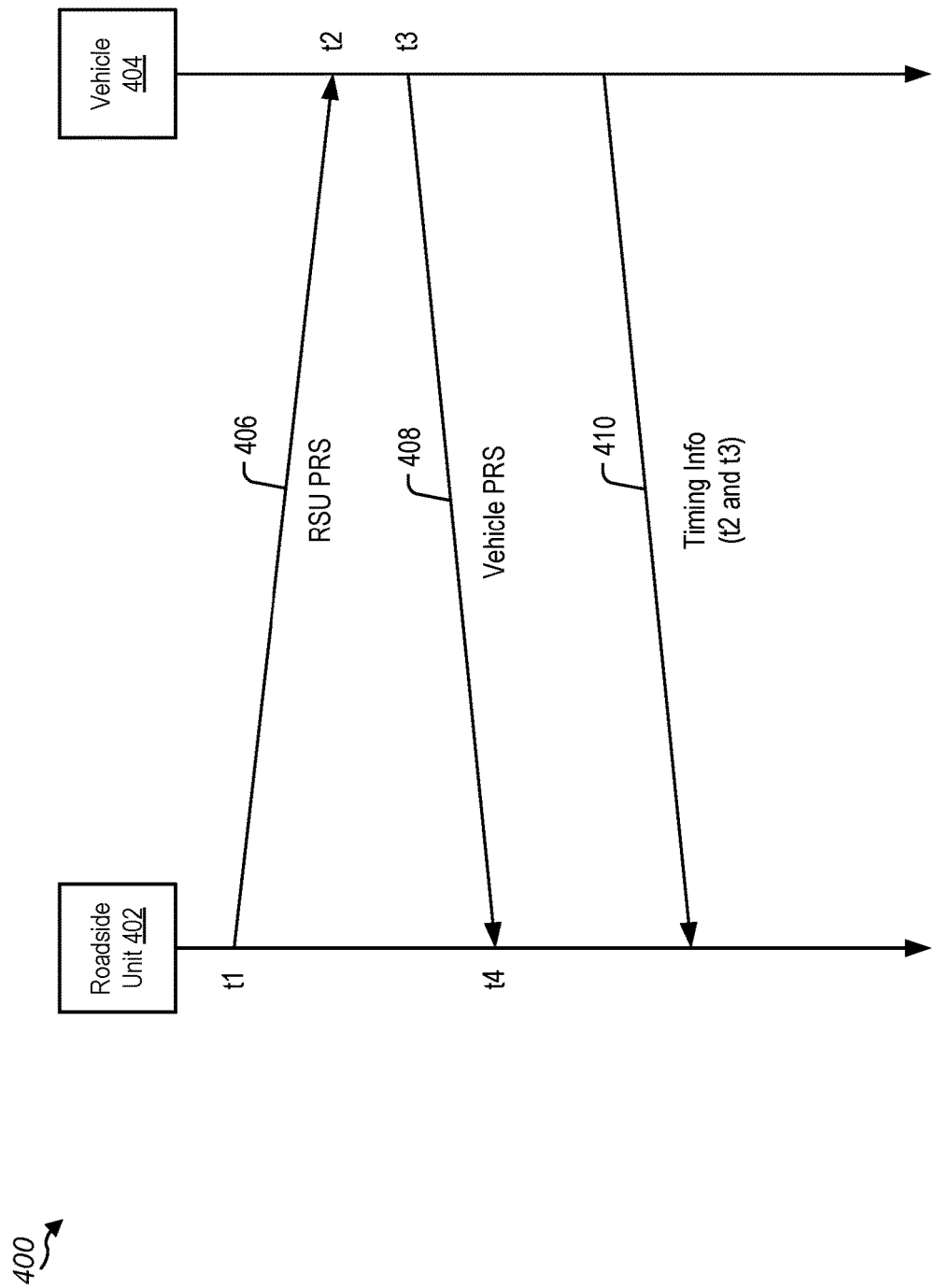
FIG. 4 is a ladder diagram illustrating a second example of determining a position of a vehicle using a PRS scheme according to some aspects of the present disclosure.

FIG. 4 is a ladder diagram 400 illustrating a second example of determining a position of a vehicle using a PRS scheme according to some aspects of the present disclosure. The example described with reference to FIG. 4 corresponds to a sidelink-assisted (SL-a) positioning scheme in which a fixed device, such as a RSU or a server, estimates or computes the positions of the vehicles on their behalf.

Ladder diagram 400 illustrates operations performed by a roadside unit (RSU) 402 and a vehicle 404 according to a SL-a positioning scheme. Although RSU 402 is described in FIG. 4, in other implementations, RSU 402 may be replaced with a server, such as a S-LCF.

RSU 402 may broadcast a first PRS (e.g., an RSU PRS) to vehicle 404, at 406. RSU 402 may measure a departure time t1 of the first PRS from RSU 402, and vehicle 404 may measure an arrival time t2 of the first PRS at vehicle 404. Based on receiving the first PRS, vehicle 404 may broadcast a second PRS (e.g., a vehicle PRS) to RSU 402, at 408. Vehicle 404 may measure a departure time t3 of the second PRS from vehicle 404, and RSU 402 may measure an arrival time t4 of the second PRS at RSU 402. In some implementations, the first PRS and the second PRS are broadcast via the unlicensed spectrum. After PRS broadcasts are complete, vehicle 404 may transmit timing information to RSU 402, at 410. The timing information may include t2 (e.g., the arrival time of the first PRS at vehicle 404) and t3 (e.g., the departure time of the second PRS from vehicle 404). In some implementations, the timing information is communicated via a V2X communication or an ITS-G5 communication, as non-limiting examples. RSU 402 may estimate or compute a position of vehicle 404 and, in some implementations, a clock error, based on the timing information, and may transmit position data (and clock data) to vehicle 404.

The present disclosure provides systems, apparatus, methods, and computer-readable media for supporting PRS-based positioning using directional communication beams. For example, the present disclosure describes design of a PRS-based positioning process, including group formation, LBT sequencing, and PRS broadcast ordering and timing, that may be performed by devices that communicate using directional communication beams (as compared to omni-directional communication beams). The techniques of the present disclosure may, for example, support PRS-based positioning by vehicles configured for wireless communications in the sub-6 GHz spectrum, the mmWave spectrum (e.g., at frequencies greater than 30 GHz, such as between 30-300 GHz), or both.

To illustrate, in an example implementation, one or more vehicles (e.g., a UE integrated within each vehicle, or components thereof) and one or more RSUs may form a PRS group based on geographic proximity. One member of the group may be assigned the role of initiator, or may take the role of initiator by virtue of forming the PRS group. Other group member(s) are assigned the role of responders. As described further herein, roles within the PRS group may be assigned in various manners, such as by higher level signaling, based on fixed locations of the respective devices, based on accuracy of determined or estimated positions of the respective devices, or based on other characteristics. The initiator may perform a LBT procedure to gain access to a wireless communication channel for the PRS group, and may indicate channel access to the other members of the group. Responder devices may each transmit a number of antenna beams (e.g., directional antenna beams) supported at the respective responder device, and the initiator may determine a PRS broadcast sequence and a channel occupancy time (CoT) for the PRS group. The PRS broadcast sequence may indicate a sequence (e.g., an order) in which members of the PRS group are scheduled to broadcast a respective PRS, and the CoT may be based on the total number of antenna beams supported by the PRS group. The initiator may transmit the PRS broadcast sequence, the CoT, and the number of antenna beams supported by each member of the PRS group to the other members of the PRS group.

A RSU within the PRS group may receive an indicator of channel access and the other PRS group information and, based on being identified as first in the PRS broadcast sequence, broadcast a first PRS via each antenna beam of a plurality of antenna beams supported by the RSU (e.g., the RSU includes an antenna array configured to communicate via the plurality of antenna beams). In some implementations, the RSU may sequentially broadcast the first PRS via each antenna beam of the plurality of antenna beams. For example, the RSU may broadcast the first PRS via a first antenna beam, followed by broadcasting (e.g., rebroadcasting) the first PRS via a second antenna beam, followed by broadcasting the first PRS by each remaining antenna beam sequentially. The RSU may be configured to broadcast the first PRS via each of the antenna beams using a same sequence but a different cyclic shift, such that receiving devices are able to identify which broadcast (or rebroadcast) of the first PRS is received based on the cyclic shift of the received broadcast. As used herein, broadcasting may refer to transmission of signals or information to all wireless communication devices within a particular communication range or within a broadcast group, such as a PRS group, and transmitting may refer to transmission of signals or information to a particular wireless communication device or a particular plurality of wireless communication devices.

Each vehicle (e.g., each UE), and any other RSUs, of the PRS group may subsequently sequentially broadcast a corresponding PRS via one or more antenna beams, based on an order associated with the vehicle in the PRS broadcast sequence. For example, a vehicle (e.g., a UE) may receive the indication of channel availability and the additional channel information from the initiator, and subsequently, may receive a broadcast of the first PRS from the RSU. The vehicle may wait until determining that no other member of the PRS group is scheduled for PRS broadcasts before the vehicle. For example, the vehicle may determine if a most recently received PRS broadcast (e.g., the broadcast of the first PRS) is received from a PRS group member that is immediately before the vehicle in the PRS broadcast sequence and, if so, that the PRS group member has completed PRS broadcasting based on a cyclic shift associated with the most recently received PRS broadcast and a number of antenna beams associated with the PRS group member. After such a determination, the vehicle may sequentially broadcast a second PRS via one or more antenna beams supported by an antenna array of the vehicle. The remaining PRS group members may similarly sequentially broadcast a respective PRS via one or more respective antenna beams. Although an RSU in this example is described as being first in the PRS broadcast sequence, in other implementations, a vehicle may be first in the PRS broadcast sequence, such as if the PRS group is formed without any RSUs.

After completion of PRS broadcasts by all members of the PRS group, timing data may be exchanged between the RSU and the vehicles to enable estimation of positions of the vehicles. In some implementations, the RSU may receive timing information from the vehicles, estimate positions of the vehicles based on the timing information and timing measured at the RSU, and transmit the estimated positions to the vehicles. In some other implementations, the vehicles may receive timing information from the RSU and estimate a respective relative position based on the timing information and timing measured at the vehicles. The RSU (or the vehicles) may provide timing information for each broadcast of the respective PRS, so that the vehicles (or the RSU) may estimate the position based on accurate timing information.

Particular implementations of the subject matter described in this disclosure can be implemented to realize one or more of the following potential advantages. In some aspects, the present disclosure provides techniques for supporting PRS-based positioning using directional communication beams. For example, devices may be grouped into a PRS group and may take turns sequentially broadcasting a respective PRS via one or more antenna beams supported by the respective device. After completion of all scheduled PRS broadcasts, the devices may exchange timing information that indicates timing of each broadcast of the respective PRS, which may enable position estimation based on accurate timing information. In this manner, penetration or coverage issues of PRSs due to beam directionality are compensated for by the techniques disclosed herein. Thus, the disclosed techniques may enable PRS-based positioning by vehicles configured to communicate in the mmWave spectrum.

Figure 5:
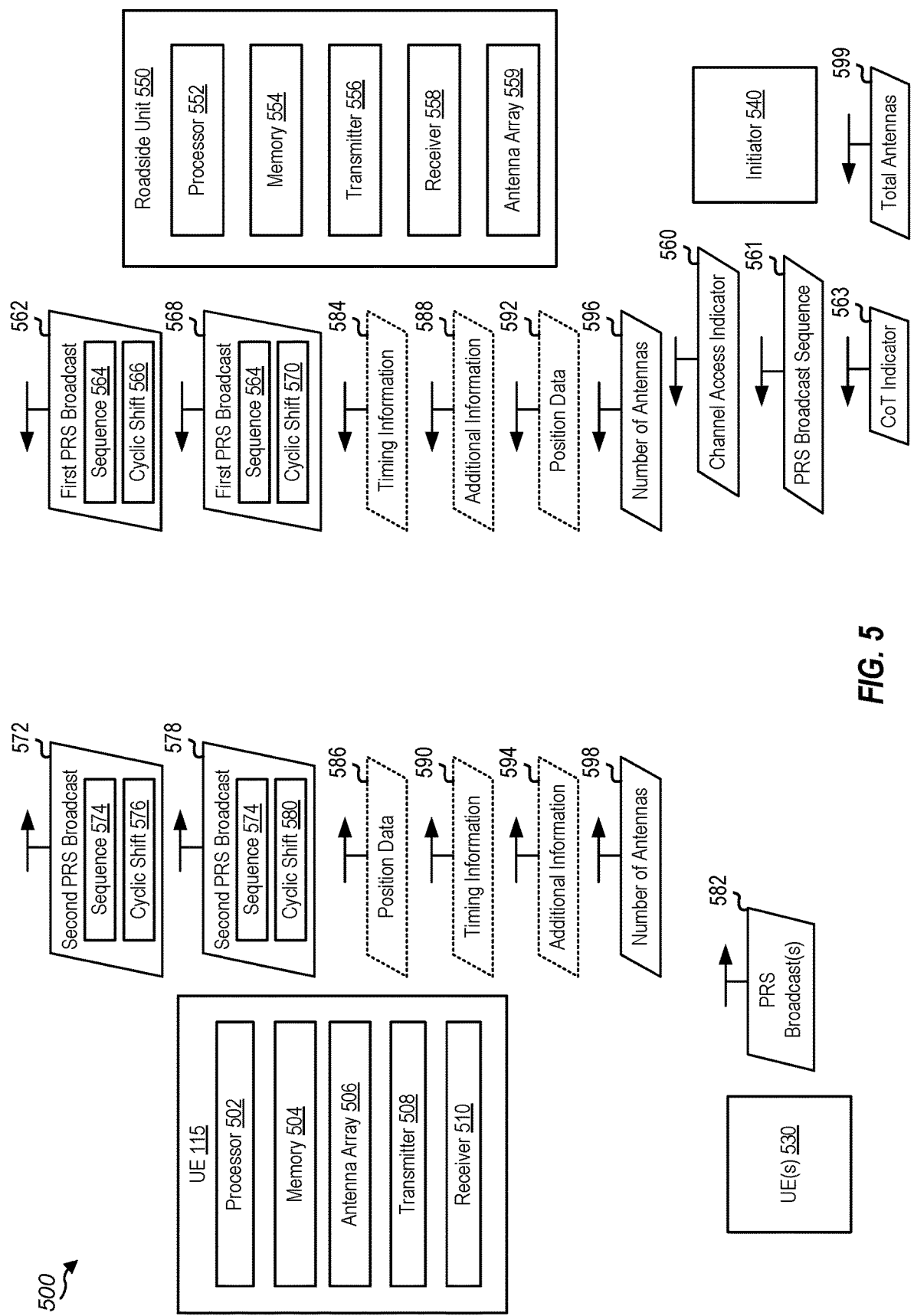
FIG. 5 is a block diagram illustrating an example of a system for enabling determination of a position of a vehicle using PRSs communicated in the millimeter wave band according to some aspects of the present disclosure.

FIG. 5 is a block diagram of an example wireless communications system 500 for enabling determination of a position of a vehicle using PRSs communicated in the mmWave band according to some aspects of the present disclosure. In some implementations, wireless communications system 500 may implement aspects of wireless network 100. Wireless communications system 500 includes UE 115, one or more UEs 530, an initiator 540, and a roadside unit (RSU) 550. Each of UE 115 and UEs 530 may be a vehicle (or components thereof). A vehicle may include a car, a truck, a motorcycle, other types of land craft, an aircraft, a watercraft, or a combination thereof. Vehicles may be at least partially operated by a user, or may be autonomous or semi-autonomous, such as an unmanned aerial vehicle (UAV) (e.g., a drone), an unmanned land vehicle, or an unmanned water vehicle. Additionally or alternatively, the UE 115 and the one or more UEs 530 may include or correspond to other movable devices, such as wearables (e.g., watches, biological monitors, fitness devices, and the like for pedestrians or users in non-network enabled vehicles), UE-enabled bicycles, UE-enabled skateboards, UE-enabled personal mobility devices, and the like. RSU 550 may include or correspond to a network device having a fixed position and configured to wirelessly communicate with one or more vehicles (e.g., UEs). In some implementations, RSU 550 may function similarly to, or include, a base station, such as base station 105. Although described herein as an RSU, in some other implementations, RSU 550 may be replaced with a server, such as an S-LCF, or other network device having a fixed location. Initiator 540 may include or correspond to a UE (e.g., a vehicle) or a RSU that is currently operating as the initiator of a group that includes UE 115, UEs 530, initiator 540, and RSU 550, as further described herein. Although two UEs and one RSU 550 are illustrated, in some other implementations, wireless communications system 500 may generally include more than two UEs, and may include more than one RSU 550.

UE 115 can include a variety of components (such as structural, hardware components) used for carrying out one or more functions described herein. For example, these components can include a processor 502, a memory 504, an antenna array 506, a transmitter 508, and a receiver 510. Processor 502 may be configured to execute instructions stored at memory 504 to perform the operations described herein. In some implementations, processor 502 includes or corresponds to controller 280, and memory 504 includes or corresponds to memory 282.

Antenna array 506 (of multiple antenna panels) may include a plurality of antenna elements configured to perform wireless communications with other devices, such as UEs 530, initiator 540, and RSU 550. In some implementations, antenna array 506 may be configured to perform directional wireless communications. To illustrate, each antenna element (or set of antenna elements) of antenna array 506 may be configured to communicate using a different corresponding antenna beam having an at least partially different corresponding direction. For example, a first antenna element (or a first set of antenna elements) of antenna array 506 may be configured to communicate via a first antenna beam having a first direction, a second antenna element (or a second set of antenna elements) of antenna array 506 may be configured to communicate via a second antenna beam having a second direction, and an Nth antenna element (or an Nth set of antenna elements) of antenna array 506 may be configured to communicate via an Nth antenna beam having an Nth direction, where N is any positive integer. The direction of an antenna beams may include or correspond to an angle of departure of a center of a main lobe of the antenna beam, as a non-limiting example.

Transmitter 508 is configured to transmit reference signals, control information, and data to one or more other devices, and receiver 510 is configured to receive reference signals, synchronization signals, control information, and data from one or more other devices. For example, transmitter 508 may transmit signaling, control information, and data, and receiver 510 may receive signaling, control information, and data, via a network, such as a wired network, a wireless network, or a combination thereof. For example, UE 115 may be configured to transmit or receive signaling, control information, and data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 508 and receiver 510 may be integrated in a transceiver. Additionally, or alternatively, transmitter 508, receiver 510, or both may include and correspond to one or more components of UE 115 described with reference to FIG. 2.

RSU 550 can include a variety of components (such as structural, hardware components) used for carrying out one or more functions described herein. For example, these components can include a processor 552, a memory 554, a transmitter 556, a receiver 558, and an antenna array 559. Processor 552 may be configured to execute instructions stored at memory 554 to perform the operations described herein. In some implementations, processor 552 includes or corresponds to controller 240, and memory 554 includes or corresponds to memory 242.

Transmitter 556 is configured to transmit reference signals, synchronization signals, control information, and data to one or more other devices, and receiver 558 is configured to receive reference signals, control information, and data from one or more other devices. For example, transmitter 556 may transmit signaling, control information, and data, and receiver 558 may receive signaling, control information, and data, via a network, such as a wired network, a wireless network, or a combination thereof. For example, RSU 550 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 556 and receiver 558 may be integrated in a transceiver. Additionally, or alternatively, transmitter 556, receiver 558 or both may include and correspond to one or more components of base station 105 described with reference to FIG. 2.

Antenna array 559 (or multiple antenna panels) may include a plurality of antenna elements configured to perform wireless communications with other devices, such as UE 115, UEs 530, and initiator 540. In some implementations, antenna array 559 may be configured to perform directional wireless communications. To illustrate, each antenna element (or set of antenna elements) of antenna array 559 may be configured to communicate using a different corresponding antenna beam having a different corresponding direction. For example, a first antenna element (or a first set of antenna elements) of antenna array 559 may be configured to communicate via a first antenna beam having a first direction, a second antenna element (or a second set of antenna elements) of antenna array 559 may be configured to communicate via a second antenna beam having a second direction, and an Mth antenna element (or an Mth set of antenna elements) of antenna array 559 may be configured to communicate via an Mth antenna beam having an Mth direction, where M is any positive integer.

UEs 530 may be similar to UE 115. For example, each of UEs 530 may include similar components as described with reference to UE 115. Initiator 540 may be another UE or another RSU and may include similar components as described with reference to UE 115 or RSU 550.

In some implementations, wireless communications system 500 implements a 5G NR network. For example, wireless communications system 500 may include multiple 5G-capable UEs 115 and 530 and multiple 5G-capable RSUs 550, such as UEs and RSUs configured to operate in accordance with a 5G NR network protocol such as that defined by the 3GPP. In some implementations, wireless communications system 500 is configured to support wireless communications in the mmWave spectrum.

During operation of wireless communications system 500, UE 115, UEs 530, initiator 540, and RSU 550 may be configured in a PRS group. Devices may be included in the PRS group to enable scheduled broadcasting of PRSs via a wireless communication channel, as further described herein. The PRS group may be configured in an upper layer (e.g., based on higher layer signaling). In some implementations, the PRS group may be configured based on geographic proximity. For example, RSU 550 may have a coverage area corresponding to a portion of a road, and the other devices may be included in the PRS group when the other devices move into or are otherwise positioned within the portion of the road that is covered by RSU 550. In some other implementations in which an RSU is not included in the PRS group, UE 115, UEs 530, and initiator 540 may be included in a PRS group based on position within a coverage area of a device supporting the PRS group, such as initiator 540, which may be a PRS anchor vehicle.

Forming the PRS group includes assigning roles within the PRS group. For example, initiator 540 may be assigned the role of initiator (also referred to as a group leader), and UE 115, UEs 530, and RSU 550 may each be assigned the role of responder. The roles in the PRS group may be assigned from an upper layer (e.g., via higher layer signaling between members of the PRS group). In some implementations, the initiator role is assigned to an RSU at a particular location. For example, the initiator role may be assigned to an RSU that is located approximately at the middle of the portion of road corresponding to the PRS group, or to an RSU that is located at an intersection, as non-limiting examples. In some other implementations, the initiator role may be assigned to a particular member of the PRS group based on the particular member having a fixed position or "perfect knowledge" of a position. For example, the initiator role may be assigned to an RSU, a server, or another network device having a fixed position. Alternatively, the initiator role may be assigned to a device for which a position is "perfect known" (e.g., a device having a fixed position or a position that is determinable via external means with high accuracy and precision, such as via GPS or another position measurement technique), such as an RSU (e.g., for vehicle-to-infrastructure (V2I) positioning) or a PRS anchor vehicle (e.g., for vehicle-to-vehicle (V2V) positioning). In some other implementations, the initiator role may be assigned to a particular member of the PRS group having a largest coverage area within the PRS group. In some other implementations, the initiator role may be assigned to a particular member of the PRS group based on a determined position of the particular member having a highest accuracy within the PRS group. For example, for V2V positioning, the initiator role may be assigned to a vehicle with the most accurate determined position of all members of the PRS group, such as a position determined based on an external source. In some other implementations, the initiator role may be assigned to a particular member in the PRS group based on an estimated position of the particular member having a highest accuracy within the PRS group. For example, the accuracy of position estimates may be determined or inferred based on innovations from the measurements used to estimate the position. As used herein, an "innovation" refers to the difference between an observed value of a variable at time t and the optimal forecast of that value based on information available prior to time t. In other implementations, the initiator role may be assigned based on other characteristics or parameters.

Initiator 540 (e.g., the device assigned the initiator role for the PRS group) may be configured to organize and maintain the PRS group. In some implementations, initiator 540 may be configured to communicate with other initiators (e.g., group leaders) of other PRS groups, such as to share group membership information, changes to group membership, and the like. To enable wireless communications for the PRS group, initiator 540 may be configured to perform a LBT procedure on the PRS group's behalf to obtain access to a wireless communication channel. The LBT procedure may be similar to LBT procedures performed by wireless devices that communicate in a lower frequency band (e.g., at frequencies less than those of the mmWave spectrum).

In order to determine a channel occupancy time (CoT) for the PRS group with respect to the wireless communication channel, initiator 540 needs to know the total number of antenna beams (also referred to as "sidelobes") used to communicate by the members of the PRS group. Accordingly, each member of the PRS group may transmit a number of antenna beams supported at the respective device to initiator 540 (e.g., a number of analog beams that can be generated or used to receive data or signaling at each member of the PRS group). For example, RSU 550 may transmit number of antenna beams 596 to initiator 540, where number of antenna beams 596 indicates the total number of antenna beams supported or otherwise used for communication by antenna array 559 of RSU 550. As another example, UE 115 may transmit number of antenna beams 598 to initiator 540, where number of antenna beams 598 indicates the total number of antenna beams supported or otherwise used for communication at by antenna array 506 of UE 115. UEs 530 may each similarly transmit a respective number of antenna beams supported at the UE to initiator 540. In some implementations, each member of the PRS group may support the same number of antenna beams. In some other implementations, the number of antenna beams supported by at least one member of the PRS group may be different from the number of antenna beams supported by one or more other members of the PRS group.

Initiator 540 may determine a total number of antenna beams 599 as a sum of all the antenna beams supported by the other members of the PRS group and a number of antenna beams supported by initiator 540. Initiator 540 may determine the CoT for the PRS group based at least on the total number of antenna beams 599 and a PRS broadcast duration. For example, the CoT for the PRS group may be equal to a product of the total number of antenna beams 599 and the PRS broadcast duration. Alternatively, the CoT may also include additional time associated with performing post-PRS communications, such as communication of timing information, speed information, error measurements, innovations, other information, or a combination thereof, as further described herein. In some implementations, the maximum CoT for the PRS group is less than approximately 5 ms.

After performing the LBT procedure and gaining access to the wireless communication channel, initiator 540 may transmit channel access indicator 560 to UE 115, UEs 530, and RSU 550 (e.g., the other members of the PRS group). Channel access indicator 560 may indicate access to the wireless communication channel for the PRS group, one or more parameters associated with the wireless communication channel, additional information, or a combination thereof. For example, channel access indicator 560 may identify a channel identifier associated with the wireless communication channel, a start time of access to the wireless communication channel for the PRS group, resources (e.g., time resource, frequency resources, or both) associated with the access, and the like. Additionally, initiator 540 may transmit a CoT indicator 563 and the total number of antenna beams 599 to UE 115, UEs 530, and RSU 550. CoT indicator 563 may indicate a duration of the CoT reserved for the PRS group with respect to the wireless communication channel. Total number of antenna beams 599 may indicate a total number of antenna beams supported by all members of the PRS group, and in some implementations, may also indicate the number of antenna beams supported by each member of the PRS group. Although shown in FIG. 5 as separate transmissions, in some other implementations, one or more of channel access indicator 560, CoT indicator 563, and total number of antenna beams 599 may be included in the same message or transmission.

To prevent collisions during PRS broadcasts, initiator 540 may determine a PRS broadcast sequence 561. PRS broadcast sequence 561 may indicate a sequence (e.g., an order) in which members of the PRS group are designated to broadcast corresponding PRS signals. In some implementations, RSUs (or other devices having fixed positions) are scheduled before vehicles (e.g., UEs) in PRS broadcast sequence 561. In some other implementations, initiator 540 may be scheduled first in PRS broadcast sequence 561. Other orders are also possible. After determining PRS broadcast sequence 561, initiator 540 transmits PRS broadcast sequence 561 to UE 115, UEs 530, and RSU 550 (e.g., the other members of the PRS group). Although shown in FIG. 5 as a separate transmission, in some other implementations, PRS broadcast sequence 561 may be included with one or more of channel access indicator 560, CoT indicator 563, and total number of antenna beams 599 in the same message or transmission.

After receiving channel access indicator 560 and the additional PRS group information (e.g., PRS broadcast sequence 561, CoT indicator 563, and total number of antenna beams 599), members of the PRS group may begin to broadcast respective PRS signals based on PRS broadcast sequence 561. Upon determining that it is their turn (e.g., based on PRS broadcast sequence 561), each member of the PRS group may sequentially broadcast a respective PRS via one or more antenna beams supported by the member of the PRS group.

To illustrate, RSU 550 may receive channel access indicator 560 and the additional PRS group information (e.g., PRS broadcast sequence 561, CoT indicator 563, and total number of antenna beams 599). Based on a determination that RSU 550 is scheduled first in PRS broadcast sequence 561, RSU 550 may sequentially broadcast a first PRS via each antenna beam of a plurality of antenna beams supported or used for communication by antenna array 559. The antenna beams (e.g., analog beams) may also be referred to as sidelobes or lobes and may correspond to different directions in which antenna array 559 is configured to communicate. To illustrate, RSU 550 may broadcast the first PRS via each antenna beam, one at a time, of the plurality of antenna beams supported by antenna array 559. Each antenna beam may be generated by a different antenna element, or subset of antenna elements, of antenna array 559. In some implementations, each antenna beam is associated with a different direction, and may be associated with different beamforming coefficients. In some implementations, the PRS is associated with a bandwidth of at least 40 MHz, or at least 100 MHz.

To illustrate, RSU 550 may broadcast a first PRS via a first antenna beam as first PRS broadcast 562. After completion of first PRS broadcast 562, RSU 550 may broadcast (e.g., rebroadcast) the first PRS via a second antenna beam as first PRS broadcast 568. The first antenna beam is associated with a first direction that is different than a second direction associated with the second antenna beam (e.g., the antenna beams are generated using different antenna elements of antenna array 559). If antenna array 559 supports more than two antenna beams, RSU 550 may sequentially broadcast the first PRS via each remaining antenna beam, similar to first PRS broadcast 562 and first PRS broadcast 568. Sequentially broadcasting a PRS via multiple antenna beams is further described with reference to FIG. 6.

RSU 550 may broadcast the first PRS via each antenna beam using the same sequence. For example, in each broadcast, the first PRS may have the same pseudo-random quadrature phase shift keying (QPSK) sequence that is mapped in diagonal patterns with shifts in frequency and time to avoid collision with cell-specific reference signals and an overlap with control channels such as a physical downlink control channel (PDCCH). To illustrate, RSU 550 may use sequence 564 for first PRS broadcast 562 and for first PRS broadcast 568.

To enable other members of the PRS group to determine which antenna beam is being used to broadcast the first PRS, and thus when RSU 550 will complete PRS broadcasting, RSU 550 may broadcast the first PRS via each antenna beam using a different cyclic shift. For example, RSU 550 may delay the space-time streams by a different time reference when broadcasting the first PRS via the different antenna beams. To illustrate, RSU 550 may apply cyclic shift 566 to first PRS broadcast 562 and may apply cyclic shift 570 to first PRS broadcast 568. Cyclic shift 566 may be different than cyclic shift 570, such that cyclic shift 570 results in a longer delay than cyclic shift 566. Because the cyclic shift associated with each broadcast of the first PRS is different, each broadcast of the first PRS may be individually identifiable to other members of the PRS group, at least based on the cyclic shift.

After RSU 550 has completed broadcasting the first PRS (e.g., has completed a respective broadcast of the first PRS via each antenna beam of the plurality of antenna beams supported by antenna array 559), the other members of the PRS group may each sequentially broadcast a respective PRS via one or more supported antenna beams in the order indicated by PRS broadcast sequence 561. For ease of description, operations will be described with reference to UE 115. Similar operations may be performed by any of UEs 530 and initiator 540.

UE 115 may receive a broadcast of the first PRS from RSU 550. For example, UE 115 may receive first PRS broadcast 562, first PRS broadcast 568, or another broadcast of the first PRS from RSU 550. After receiving the broadcast of the first PRS from RSU 550, UE 115 may determine whether any other member of the PRS group is scheduled for PRS broadcasts before UE 115. Determining whether any other member of the PRS group is scheduled for PRS broadcasts before UE 115 may include determining whether a most recently received PRS broadcast is received from a particular member of the PRS group that is immediately before UE 115 in PRS broadcast sequence 561. For example, if first PRS broadcast 562 is the most recently received PRS broadcast at UE 115, UE 115 may determine if RSU 550 is immediately before UE 115 (e.g., there are no intervening members of the PRS group scheduled for PRS broadcasts) in PRS broadcast sequence 561. If UE 115 determines that RSU 550 is not immediately before UE 115 in PRS broadcast sequence 561, UE 115 may continue to wait until reception of a broadcast of a respective PRS from the member of the PRS group that is immediately before UE 115 in PRS broadcast sequence 561. For example, if RSU 550 is first in PRS broadcast sequence 561 and UE 115 is third (or later) in PRS broadcast sequence 561, UE 115 may wait until UE 115 receives a broadcast of a respective PRS from the member of the PRS group that is second (or later) in PRS broadcast sequence 561.

If UE 115 determines that RSU 550 is immediately before UE 115 in PRS broadcast sequence 561 (e.g., RSU 550 is first and UE 115 is second, or RSU 550 and UE 115 are adjacent at later positions in PRS broadcast sequence 561), determining whether any other member of the PRS group is scheduled for PRS broadcasts before UE 115 may further include determining whether the particular member (e.g., the member before UE 115 in PRS broadcast sequence 561) has completed PRS broadcasting based on a cyclic shift associated with the most recently received PRS broadcast and a number of antenna beams associated with the particular member. For example, if first PRS broadcast 562 is the most recently received PRS broadcast at UE 115, UE 115 may determine what number corresponds to first PRS broadcast 562 in a sequence of PRS broadcasts by RSU 550 based on cyclic shift 566 associated with first PRS broadcast 562. To illustrate, UE 115 may have received a number of antenna beam associated with RSU 550 (e.g., included in total number of antenna beams 599 or other PRS group information received from initiator 540), and UE 115 may determine a position of first PRS broadcast 562 in a sequence of PRS broadcasts via each antenna element associated with RSU 550 based on cyclic shift 566. Based on this determination, UE 115 may determine whether there are any remaining PRS broadcasts to be performed by RSU 550. For example, if RSU 550 is associated with four antenna beams and UE 115 receives first PRS broadcast 562, UE 115 may determine, based on cyclic shift 566 indicating that the received PRS broadcast is the first PRS broadcast performed by RSU 550, that there are three remaining PRS broadcasts to be completed by RSU 550 before UE 115 may begin PRS broadcasts. As another example, if RSU 550 is associated with two antenna beams and UE 115 receives first PRS broadcast 568, UE 115 may determine, based on cyclic shift 570 indicating that the received PRS broadcast is the second PRS broadcast performed by RSU 550, that there are no remaining PRS broadcasts to be completed by RSU 550 before UE 115 may begin PRS broadcasts.

Based on a determination that no other member of the PRS group is scheduled for broadcasts before UE 115, UE 115 may sequentially broadcast a second PRS via each antenna beam of one or more antenna beams supported or used for communication by antenna array 506. The antenna beams may also be referred to as sidelobes or lobes and may correspond to different directions in which antenna array 506 is configured to communicate. To illustrate, UE 115 may broadcast the second PRS via each antenna beam, one at a time, of the one or more antenna beams supported by antenna array 506. Each antenna beam may be generated by a different antenna element, or subset of antenna elements, of antenna array 506. In some implementations, each antenna beam is associated with a different direction, and may be associated with different beamforming coefficients. In some implementations, antenna array 506 is configured to support multiple (e.g., two or more) antenna beams.

To illustrate, UE 115 may broadcast a second PRS via a first antenna beam as second PRS broadcast 572. After completion of second PRS broadcast 572, UE 115 may broadcast (e.g., rebroadcast) the second PRS via a second antenna beam as second PRS broadcast 578. The first antenna beam is associated with a first direction that is different than a second direction associated with the second antenna beam (e.g., the antenna beams are generated using different antenna elements of antenna array 506). If antenna array 506 supports more than two antenna beams, UE 115 may sequentially broadcast the second PRS via each remaining antenna beam, similar to second PRS broadcast 572 and second PRS broadcast 578.

UE 115 may broadcast the second PRS via each antenna beam using the same sequence. For example, in each broadcast, the second PRS may have the same pseudo-random QPSK sequence that is mapped in diagonal patterns with shifts in frequency and time to avoid collision with cell-specific reference signals and an overlap with control channels such as a PDCCH. To illustrate, UE 115 may use sequence 574 for second PRS broadcast 572 and for second PRS broadcast 578.

To enable other members of the PRS group to determine which antenna beam is being used to broadcast the second PRS, and thus when UE 115 will complete PRS broadcasting, UE 115 may broadcast the second PRS via each antenna beam using a different cyclic shift. For example, UE 115 may delay the space-time streams by a different time reference when broadcasting the second PRS via the different antenna beams. To illustrate, UE 115 may apply cyclic shift 576 to second PRS broadcast 572 and may apply cyclic shift 580 to second PRS broadcast 578. Cyclic shift 576 may be different than cyclic shift 580, such that cyclic shift 580 results in a longer delay than cyclic shift 576. Because the cyclic shift associated with each broadcast of the second PRS is different, each broadcast of the second PRS may be individually identifiable to other members of the PRS group, at least based on the cyclic shift.

After UE 115 has completed broadcasting second first PRS (e.g., has completed a respective broadcast of the second PRS via each antenna beam of the one or more antenna beams supported by antenna array 506), the other members of the PRS group may each sequentially broadcast a respective PRS via one or more supported antenna beams in the order indicated by PRS broadcast sequence 561. For example, each of UEs 530 may wait until a determination that no other member of the PRS group is scheduled for PRS broadcasts before broadcasting a respective PRS as PRS broadcasts 582. If any of UEs 530 support multiple antenna beams, broadcasting the respective PRS includes sequentially broadcasting the respective PRS via each antenna beam supported by UEs 530, as described with reference to RSU 550 and UE 115. Initiator 540 may perform similar operations to broadcast a respective PRS via one or more antenna beams supported by initiator 540.

After completion of all PRS broadcasts by the PRS group, post-PRS information may be shared between members of the PRS group. In some implementations, the post-PRS information is shared according to a SL-b scheme, as described with reference to FIG. 3. In some other implementations, the post-PRS information is shared according to a SL-a scheme, as described with reference to FIG. 4.

To illustrate, in implementations according to the SL-b scheme, RSU 550 may transmit timing information 584 to UE 115. Timing information 584 may include transmission times (e.g., departure times) for each broadcast of the first PRS at RSU 550, first antenna beam information indicating the antenna beams corresponding to each broadcast of the first PRS, a receipt time (e.g., an arrival time) of a received broadcast of the second PRS at RSU 550, and second antenna beam information indicating an antenna beam corresponding to receipt of the broadcast of the second PRS. For example, timing information 584 may include departure times (e.g., similar to departure time t1 described with reference to FIGS. 3-4) for each broadcast of the first PRS as measured by RSU 550, and an arrival time (e.g., similar to arrival time t4 described with reference to FIGS. 3-4) for a received broadcast of the second PRS from UE 115 as measured at RSU 550. The first antenna beam information may indicate an identifier, a cyclic shift, or both associated with each of the departure times (e.g., to enable UE 115 to determine which departure time corresponds to the broadcast of the first PRS received at UE 115), and the second antenna beam information may indicate an identifier, a cyclic shift, or both associated with the received broadcast of the second PRS at RSU 550 (e.g., to enable UE 115 to determine which broadcast of the second PRS is received by RSU 550).

In some implementations, RSU 550 may transmit additional information 588 to UE 115. For example, RSU 550 may determine a clock error noise standard deviation, a clock drift standard deviation, or both, and additional information 588 may include the clock error noise standard deviation, the clock drift standard deviation, or both. As another example, RSU 550 may determine an innovation measurement associated with PRS measurements at RSU 550, and additional information 588 may include the innovation measurement. In some implementations, the innovation measurement may include or be based on a difference between an observed value of a variable at time t and an optimal forecast of that value based on information available prior to time t.

After receiving timing information 584, UE 115 may determine position data 586 indicating an estimated position of UE 115. Position data 586 (and any other position data or estimate position data described herein) may include or indicate position coordinates, such as latitude or longitude coordinates or global positioning system (GPS) coordinates, or more relative position information, such as distances between the respective device and other devices, as a non-limiting example, or information that can be used to determine position or relative position (or triangulation), such as angle of arrival data, as a non-limiting example. UE 115 may determine position data 586 based on timing information 584, a receipt time (e.g., an arrival time) of a received broadcast of the first PRS from RSU 550 as measured at UE 115 (e.g., corresponding to arrival time t2 as described with reference to FIGS. 3-4), and a transmission time (e.g., a departure time) of the broadcast of the second PRS by the particular antenna beam indicated by the second antenna beam information included in timing information 584 (e.g., corresponding to departure time t3 as described with reference to FIGS. 3-4). For example, UE 115 may determine position data 586 as described above with reference to FIG. 3. In some implementations, UE 115 may also receive additional information 588 from RSU 550, and UE 115 may determine position data 586 based further on additional information 588. After determining position data 586, UE 115 may transmit position data 586 to RSU 550. In some implementations, UE 115 may determine clock information or adjust a clock signal based on timing information 584 and additional information 588.

In some implementations according to the SL-a scheme, UE 115 may transmit timing information 590 to RSU 550. Timing information 590 may include a receipt time (e.g., an arrival time) of a received broadcast of the first PRS at UE 115, first antenna beam information indicating an antenna beam corresponding to the received broadcast of the first PRS, transmission times (e.g., departure times) for each broadcast of the second PRS at UE 115, and second antenna beam information indicating the antenna beams corresponding to each broadcast of the second PRS. For example, timing information 590 may include an arrival time (e.g., similar to arrival time t2 described with reference to FIGS. 3-4) for a received broadcast of the first PRS from RSU 550 as measured at UE 115, and departure times (e.g., similar to departure time t3 described with reference to FIGS. 3-4) for each broadcast of the second PRS as measured by UE 115. The first antenna beam information may indicate an identifier, a cyclic shift, or both associated with the received broadcast of the first PRS at UE 115 (e.g., to enable RSU 550 to determine which broadcast of the first PRS is received by UE 115), and the second antenna beam information may indicate an identifier, a cyclic shift, or both associated with each of the departure times (e.g., to enable RSU 550 to determine which departure time corresponds to the broadcast of the second PRS received at RSU 550).

In some implementations, UE 115 may transmit additional information 594 to RSU 550. For example, UE 115 may determine speed information associated with UE 115 (e.g., information indicating one or more speed measurements or estimates of UE 115), and additional information 594 may include the speed information. Although referred to as speed information, in other examples, the speed information may include or be replaced with other information, such as velocity information, Doppler-related information, flight information (e.g., for UAVs), and the like. As another example, UE 115 may determine a clock error noise standard deviation, a clock drift standard deviation, or both, and additional information 594 may include the clock error noise standard deviation, the clock drift standard deviation, or both. As another example, UE 115 may determine an innovation measurement associated with PRS measurements at UE 115, and additional information 594 may include the innovation measurement.

After receiving timing information 590, RSU 550 may determine position data 592 indicating an estimated position of UE 115. RSU 550 may determine position data 592 based on timing information 590, a transmission time (e.g., a departure time) of the broadcast of the first PRS by the particular antenna beam indicated by the first antenna beam information included in timing information 590 (e.g., corresponding to departure time t1 as described with reference to FIGS. 3-4), and a receipt time (e.g., an arrival time) of a received broadcast of the second PRS from UE 115 as measured at RSU 550 (e.g., corresponding to arrival time t4 as described with reference to FIGS. 3-4). For example, RSU 550 may determine position data 592 as described above with reference to FIG. 3. In some implementations, RSU 550 may also receive additional information 594 from UE 115, and RSU 550 may determine position data 592 based further on additional information 594. After determining position data 592, RSU 550 may transmit position data 592 to UE 115. In some implementations, RSU 550 may determine clock information for UE 115 based on a clock signal of RSU 550, timing information 590, the corresponding departure time t1, and the corresponding arrival time t4 (and optionally additional information 594), similar to determining position data 592. RSU 550 may transmit the clock information to UE 115 for use in generating or adjusting a clock signal at UE 115.

RSU 550 and UEs 530 and initiator 540 may similarly share timing information and determine position data, according to either the SL-b scheme or the SL-a scheme, as described above with reference to RSU 550 and UE 115. Although RSU 550 and UE 115 have been described as being assigned the responder role in the PRS group, in other implementations, RSU 550 or UE 115 may be assigned the initiator role (and initiator 540 may be absent). In such implementations, RSU 550 or UE 115 may perform operations to manage the PRS group, such as performing the LBT procedure and sharing channel access indicator 560, PRS broadcast sequence 561, CoT indicator 563, and total number of antenna beams 599, in addition to the operations described above with respect to RSU 550 or UE 115. Additionally or alternatively, although RSU 550 is described as being scheduled first for PRS broadcasting, in other implementations, initiator 540 (or any member of the PRS group that is assigned the initiator role) may schedule any member of the PRS group, including initiator 540, as first for performing PRS broadcasts.

As described with reference to FIG. 5, wireless communications system 500 may support PRS-based positioning using directional communication beams. For example, each member of a PRS group may sequentially broadcast a respective PRS via one or more antenna beams supported at the member of the PRS group. Each broadcast by a particular group member may have a different cyclic shift to enable identification of an individual broadcast by the other members of the PRS group. Based on PRS broadcast sequence 561 and total number of antenna beams 599, each member of the PRS group may determine when all group members scheduled prior to that group member have completed PRS broadcasts and may initiate their own PRS broadcast(s). Additionally, timing information shared by members of the PRS group may include antenna beam specific timing information and information to identify which broadcast (e.g., corresponding to which antenna beam) was received by the other members of the PRS group. In this manner, PRS-based positioning may be supported for communications in high frequency bands, such as in the mmWave spectrum.

Figure 6:
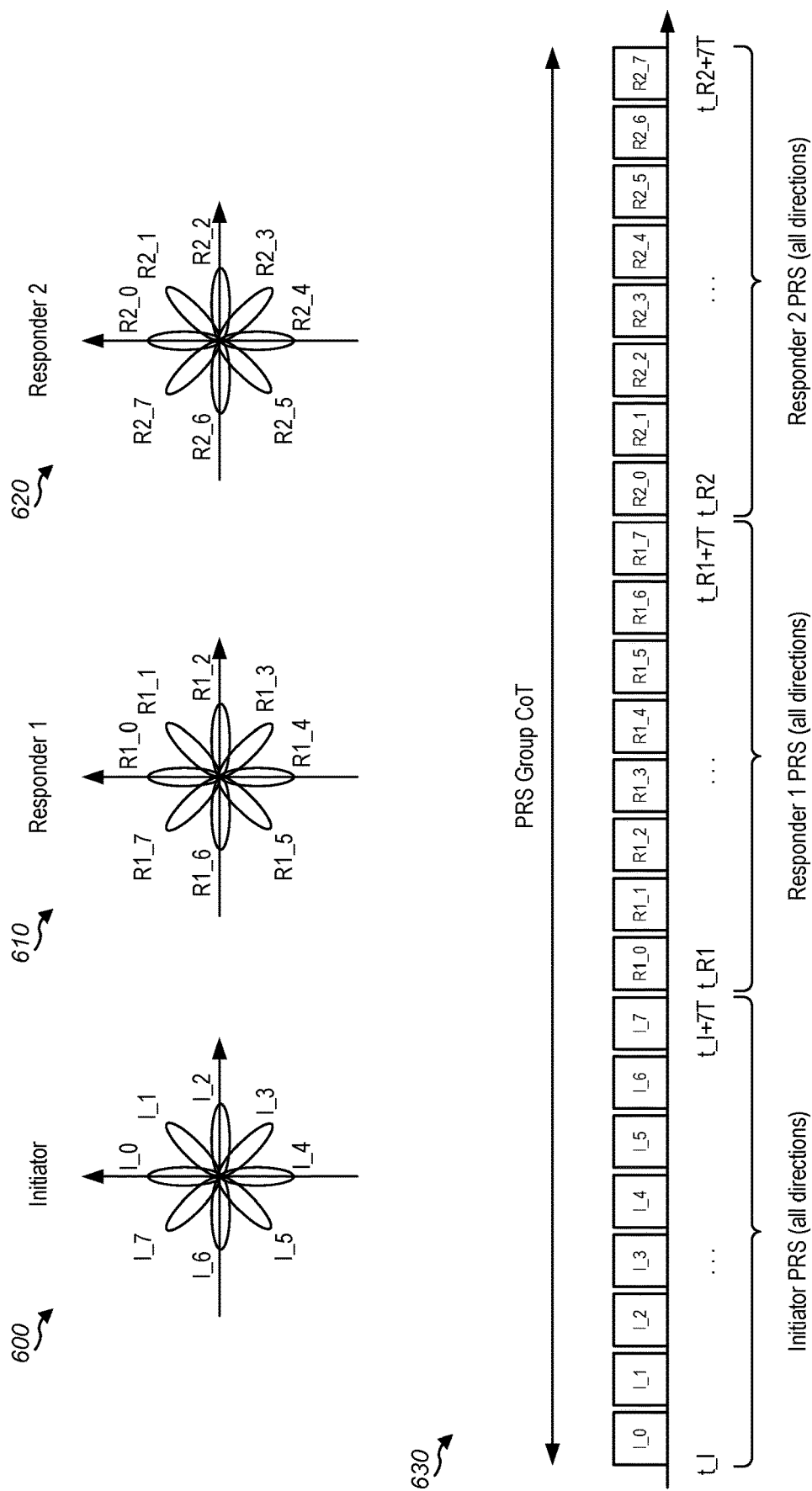
FIG. 6 includes multiple diagrams illustrating examples of broadcasting PRSs via different antenna beams according to some aspects of the present disclosure.

FIG. 6 includes multiple diagrams illustrating examples of broadcasting PRSs via different antenna beams according to some aspects of the present disclosure. For example, FIG. 6 includes a first diagram 600 of antenna beams used for broadcasting a first PRS by an initiator ("Initiator") of a PRS group, a second diagram 610 of antenna beams used for broadcasting a second PRS by a first responder device ("Responder 1") of the PRS group, and a third diagram 620 of antenna beams used for broadcasting a third PRS by a second responder device ("Responder 2") of the PRS group. Each of Initiator, Responder 1, and Responder 2 may include or correspond to an RSU (or other device having a fixed location, such as a server) or a vehicle (e.g., a UE integrated in the vehicle, or components thereof). In some implementations, Initiator, Responder 1, and Responder 2 may include or correspond to initiator 540 (or RSU 550 if RSU 550 is assigned the initiator role), UE 115, and UEs 530 of FIG. 5, respectively.

Each of Initiator, Responder 1, and Responder 2 may sequentially broadcast a respective PRS via each antenna beam (e.g., lobe or sidelobe) of one or more antenna beams supported by the respective device, such as by an antenna array of the respective device. For example, Initiator may sequentially broadcast a first PRS via a first antenna beam I_0, a second antenna beam I_1, a third antenna beam I_2, a fourth antenna beam I_3, a fifth antenna beam I_4, a sixth antenna beam I_5, a seventh antenna beam I_6, and an eighth antenna beam I_7. Similarly, Responder 1 may sequentially broadcast a second PRS via antenna beams R1_0-R1_7, and Responder 2 may sequentially broadcast a third PRS via antenna beams R2_0-R2_7. Although Initiator, Responder 1, and Responder 2 are shown in FIG. 6 as broadcasting a respective PRS via eight antenna beams (e.g., lobes or sidelobes), in other implementations, Initiator, Responder 1, and Responder 2 may each broadcast a respective PRS via fewer than eight or more than eight antenna beams. Additionally, although Initiator, Responder 1, and Responder 2 are shown in FIG. 6 as supporting the same number of antenna beams (e.g., eight), in other implementations, one or more of Initiator, Responder 1, and Responder 2 may support a different number of antenna beams than others of Initiator, Responder 1, and Responder 2.

As shown in FIG. 6, each antenna beam (e.g., lobe or sidelobe) used by a device to broadcast a respective PRS may have a different direction than the other antenna beams used by the same device for the other PRS broadcasts. For example, the first antenna beam I_0 may have a different direction than the antenna beams I_1-I_7, the second antenna beam I_1 may have a different direction than the antenna beams I_0 and I_2-I_7, the third antenna beam I_2 may have a different direction than the antenna beams I_0-I_1 and I_3-I_7, etc. Similarly, the antenna beams R1_0-R1_7 may each have a different direction, and the antenna beams R2_0-R2_7 may each have a different direction. Each of the antenna beams I_0-I_7, R1_0-R1_7, and R2_0-R2_7 may be generated by different antenna elements (or subsets of antenna elements) of an antenna array of the respective device, as described with reference to FIG. 5.

To enable distinguishing or identification of which PRS broadcast (or rebroadcast) is received by other members of the PRS group, each PRS broadcast by a device may have a different cyclic shift than other PRS broadcasts by the same device. For example, the first PRS broadcast via the first antenna beam I_0 may have a first cyclic shift, the first PRS broadcast via the second antenna beam I_1 may have a second cyclic shift, the first PRS broadcast via the third antenna beam I_2 may have a third cyclic shift, the first PRS broadcast via the fourth antenna beam I_3 may have a fourth cyclic shift, the first PRS broadcast via the fifth antenna beam I_4 may have a fifth cyclic shift, the first PRS broadcast via the sixth antenna beam I_5 may have a sixth cyclic shift, the first PRS broadcast via the seventh antenna beam I_7 may have a seventh cyclic shift, and the first PRS broadcast via the eighth antenna beam I_7 may have an eighth cyclic shift. Similarly, each second PRS broadcast via antenna beams R1_0-R1_7 may have a different cyclic shift, and each third PRS broadcast via antenna beams R2_0-R2_7 may have a different cyclic shift.

FIG. 6 also includes a timing diagram 630. Timing diagram 630 illustrates timing of the PRS broadcasts of Initiator, Responder 1, and Responder 2. Timing diagram 630 also illustrates a PRS group CoT that includes a time for all PRS broadcasts within the PRS group. The PRS group CoT may indicate a duration of time for which access to a wireless communication channel is reserved by Initiator for the PRS group. The PRS group CoT may include an amount of time sufficient for all PRS broadcasts by all members of the PRS group. For example, the PRS group CoT may be a product of the total number of antenna beams supported by all members of the PRS group (e.g., 24 in the example of FIG. 6) and a PRS broadcast duration, which may be the same for all PRS broadcasts by all members of the PRS group. In other implementations, the PRS group CoT may include additional time for post-PRS communications, as described with reference to FIG. 5. As shown in timing diagram 630, Initiator, Responder 1, and Responder 2 each sequentially broadcast the respective PRS via all supported antenna elements in order. The order may be indicated by a PRS group sequence determined by Initiator. Although Initiator is shown as being first to perform PRS broadcasts in the example of FIG. 6, in other implementations, Initiator may schedule any member of the PRS group to be first. As shown in FIG. 6, Initiator sequentially broadcasts the first PRS via antenna elements I_0-I_7 at times t_I-t_I+7T, followed by Responder 1 sequentially broadcasting the second PRS via antenna elements R1_0-R1_7 at times t_R1–t_R1+7T, followed by Responder 2 sequentially broadcasting the third PRS via antenna elements R2_0-R2_7 at times t_R2–t_R2+7T, where T is a PRS broadcast duration.

A device that receives a PRS broadcast may identify the PRS broadcast based on the cyclic shift and determine whether the device is able to begin PRS broadcasting based on the received PRS broadcast, the PRS broadcast sequence, and the number of antenna beams associated with each other member of the PRS group. For example, if Responder 1 receives the broadcast of the first PRS via the third antenna beam I_3, Responder 1 may determine that the received PRS broadcast is the third PRS broadcast performed by Initiator based on a cyclic shift of the received PRS broadcast. Responder 1 may also determine that, based on Initiator being immediately prior to Responder 1 in the PRS broadcast sequence and being associated with eight antenna beams, Responder 1 is to wait for five additional PRS broadcast durations before beginning its own PRS broadcasts. As another example, if Responder 2 receives the broadcast of the second PRS via antenna beam R1_5, Responder 2 may determine that the received PRS broadcast is the sixth PRS broadcast performed by Responder 1 based on a cyclic shift of the received PRS broadcast. Responder 2 may also determine that, based on Responder 1 being immediately prior to Responder 2 in the PRS broadcast sequence and being associated with eight antenna beams, Responder 2 is to wait for two additional PRS broadcast durations before beginning its own PRS broadcasts. In this manner, sequentially broadcasting a PRS using different cyclic shifts enables other members of the PRS group to determine when to begin respective PRS broadcasts, thereby enabling each member of the PRS group to perform one or more sequential PRS broadcasts without collisions during the PRS group CoT.

Figure 7:
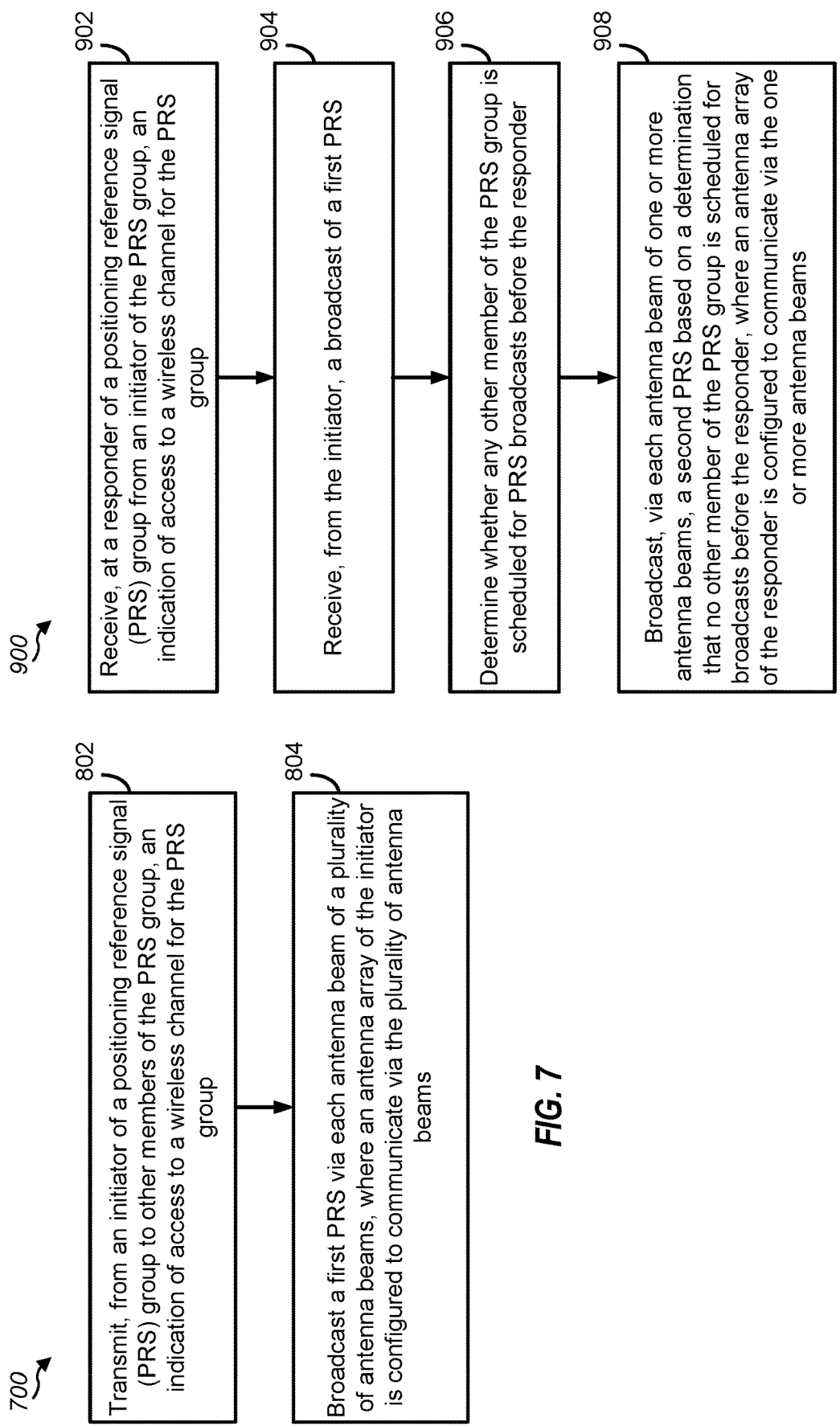
FIG. 7 is a flow chart of an example of a method for sequentially broadcasting a PRS via multiple antenna beams of a roadside unit (RSU) according to some aspects of the present disclosure.
Figure 8:
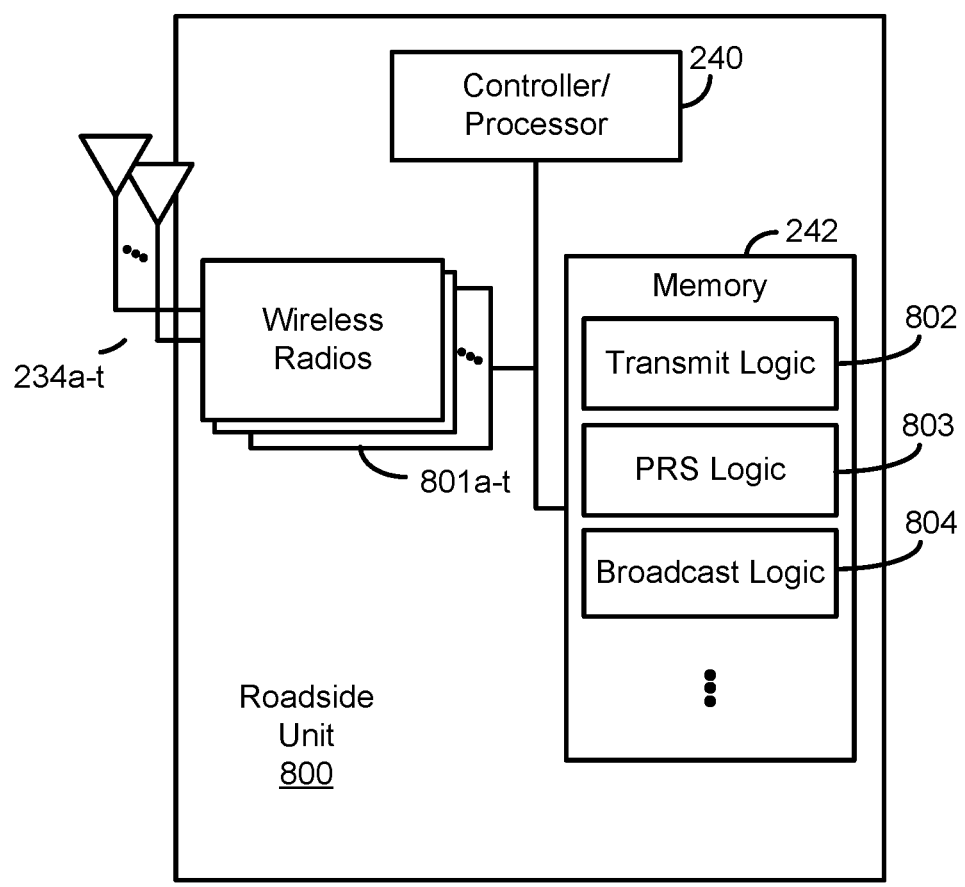
FIG. 8 is a block diagram of an example of a RSU configured to sequentially broadcast a PRS via multiple antenna beams according to some aspects of the present disclosure.

FIG. 7 is a flow diagram of an example process 700 of RSU operations for sequentially broadcasting a PRS via multiple antenna beams of a RSU according to some aspects of the present disclosure. In some implementations, process 700 may be performed by RSU 550 or a RSU as illustrated in FIG. 8. In some other implementations, process 700 may be performed by an apparatus configured for wireless communication. For example, the apparatus may include at least one processor, and a memory coupled to the processor. The processor may be configured to perform operations of process 700. In some other implementations, process 700 may be performed or executed using a non-transitory computer-readable medium having program code recorded thereon. The program code may be program code executable by a computer for causing the computer to perform operations of process 700. In some implementations, the RSU operations are performed by an RSU that is assigned an initiator role for a PRS group.

Example operations (also referred to as "blocks") of process 700 will also be described with respect to RSU 800 as illustrated in FIG. 8. FIG. 8 is a block diagram illustrating an example of RSU 800 configured to sequentially broadcast a PRS via multiple antenna beams according to some aspects of the present disclosure. RSU 800 may include RSU 550 of FIG. 5, as an illustrative, non-limiting example. RSU 800 includes the structure, hardware, and components as illustrated for base station 105 of FIGS. 1 and 2, RSU 550 of FIG. 5, or a combination thereof. For example, RSU 800 may include controller 240, which operates to execute logic or computer instructions stored in memory 242, as well as controlling the components of RSU 800 that provide the features and functionality of RSU 800. RSU 800, under control of controller 240, transmits and receives signals via wireless radios 801a-t and antennas 234a-t. Wireless radios 801a-t include various components and hardware, as illustrated in FIG. 2 for base station 105, including modulator/demodulators 232a-t, transmit processor 220, TX MIMO processor 230, MIMO detector 236, and receive processor 238.

As shown, memory 242 may include transmit logic 802, PRS logic 803, and broadcast logic 804. Transmit logic 802 may be configured to enable transmission of information or signals, such as a PRS, to other devices. PRS logic 803 may be configured to generate a PRS for broadcasting to the other devices. Broadcast logic 804 may be configured to initiate broadcast of information or signals to the other devices, such as the PRS. RSU 800 may receive signals from or transmit signals to one or more UEs, such as UE 115 of FIGS. 1-2 and 5, UEs 530 of FIG. 5, or a UE described with reference to FIG. 10, or to another RSU.

Returning to process 700 described with reference to FIG. 7, as illustrated at block 702, RSU 800 transmits, from an initiator of a PRS group to other members of the PRS group, an indication of access to a wireless channel for the PRS group. As an example of block 702, RSU 800 may transmit an indication of wireless channel access using wireless radios 801a-t and antennas 252a-t, and using transmit logic

802. For example, RSU 800 may execute, under control of controller 280, transmit logic 802 stored in memory 282. The execution environment of transmit logic 802 provides the functionality to transmit, from an initiator (e.g., RSU 800) of a PRS group to other members of the PRS group, an indication of access to a wireless channel for the PRS group.

At block 704, RSU 800 broadcasts a first PRS via each antenna beam of a plurality of antenna beams. An antenna array of RSU 800 is configured to communicate via the plurality of antenna beams. To illustrate, RSU 800 may broadcast the first PRS using wireless radios 801*a-t* and antennas 252*a-t* (e.g., an antenna array). To further illustrate, RSU 800 may execute, under control of controller 280, PRS logic 803 and broadcast logic 804 stored in memory 282. The execution environment of PRS logic 803 provides the functionality to generate a first PRS for broadcasting and to set parameters of each broadcast, such as a sequence and a cyclic shift, as non-limiting examples. The execution environment of broadcast logic 804 provides the functionality to broadcast the first PRS via each antenna beam of a plurality of antenna beams supported by RSU 800.

In some implementations, the initiator includes or corresponds to a RSU. Alternatively, the initiator may include or correspond to a UE. Additionally or alternatively, broadcasting the first PRS via each antenna beam of the plurality of antenna beams may include sequentially broadcasting the first PRS via each antenna beam of the plurality of antenna beams. Additionally or alternatively, process 700 may also include using the same sequence for each broadcast of the first PRS. Additionally or alternatively, process 700 may include applying a different cyclic shift to the each broadcast of the first PRS. Additionally or alternatively, broadcasting the first PRS may include communicating in the mmWave band. Additionally or alternatively, each antenna beam of the plurality of antenna beams may be associated with an at least partially different direction.

In some implementations, process 700 further includes receiving a broadcast of a second PRS from a wireless communication device allocated a responder role in the PRS group. In some such implementations, the wireless communication device includes a vehicle or a component of a vehicle. Additionally or alternatively, process 700 may also include transmitting timing information to the wireless communication device after receipt of a corresponding PRS broadcast from each remaining member included in the PRS group. In some such implementations, the timing information may include transmission times for each broadcast of the first PRS, first antenna beam information indicating the antenna beams corresponding to each broadcast of the first PRS, a receipt time of the broadcast of the second PRS, and second antenna beam information indicating an antenna beam corresponding to receipt of the broadcast of the second PRS. Additionally or alternatively, process 700 may further include receiving position data from the wireless communication device. The position data may be based, at least in part, on the timing information. In some such implementations, process 700 may also include determining a measured clock error noise standard deviation at the initiator, a clock drift standard deviation, or both, and transmitting the measured clock error noise standard deviation at the initiator, the clock drift standard deviation, or both, to the UE prior to receipt of the position data. Additionally or alternatively, process 700 may also include determining an innovation measurement associated with PRS measurements at the RSU, and transmitting the innovation measurement to the wireless communication device prior to receipt of the position data.

In some implementations in which process 700 further includes receiving a broadcast of a second PRS from a wireless communication device, process 700 may also include receiving timing information from the wireless communication device after receipt of corresponding PRS broadcasts from each remaining member of the PRS group, determining position data indicating an estimated position of the UE based on the timing information, a transmission time for the broadcast of the first PRS via an antenna beam indicated by the timing information, and a receipt time of the broadcast of the second PRS, and transmitting the position data to the wireless communication device. In some such implementations, process 700 may further include determining clock information for the wireless communication device based on a clock signal of the initiator and the timing information, and transmitting the clock information to the wireless communication device. Additionally or alternatively, the timing information from the wireless communication device may include a receipt time of a broadcast of the first PRS at the wireless communication device, antenna beam information indicating the antenna beam corresponding to receipt of the broadcast of the first PRS at the wireless communication device, transmission times for one or more broadcasts of the second PRS by the wireless communication device, and second antenna beam information indicating at least one antenna beam corresponding to broadcast of the second PRS. Additionally or alternatively, process 700 may also include receiving speed information from the wireless communication device. The position data may be further based on the speed information. Additionally or alternatively, process 700 may also include receiving, from the wireless communication device, a measured clock error noise standard deviation at the wireless communication device, a clock drift standard deviation at the wireless communication device, or both. The position data may be further based on the measured clock error noise standard deviation, the clock drift standard deviation, or both. Additionally or alternatively, process 700 may also include receiving, from the wireless communication device, an innovation measurement associated with PRS measurements at the wireless communication device. The position data may be further based on the innovation measurement.

In some implementations, process 700 further includes transmitting, to the other members of the PRS group, a PRS broadcast sequence associated with the PRS group. The PRS broadcast sequence may indicate a sequence in which members of the PRS group are designated to broadcast corresponding PRS signals. Additionally or alternatively, process 700 may also include receiving, from a member of the PRS group, a number of antenna beams used by the member of the PRS group. In some such implementations, process 700 may further include transmitting, to the other members of the PRS group, an indication of a CoT for the PRS group on the wireless channel. The CoT may be based on a total number of antenna beams used by all members of the PRS group.

In some implementations, roles in the PRS group are assigned via higher layer signaling between members of the PRS group. Additionally or alternatively, an initiator role in the PRS group may be assigned to an RSU located at a particular location. Additionally or alternatively, an initiator role in the PRS group may be assigned to a particular member of the PRS group based on the particular member having a fixed position or perfect knowledge of a position. In some such implementations, the initiator includes an RSU or a PRS anchor vehicle. Additionally or alternatively, an initiator role in the PRS group may be assigned to a particular member of the PRS group having a largest coverage area within the PRS group. Additionally or alternatively, an initiator role in the PRS group may be assigned to a particular member in the PRS group based on a determined position of the particular member having a highest accuracy within the PRS group. Additionally or alternatively, an initiator role in the PRS group may be assigned to a particular member in the PRS group based on an estimated position of the particular member having a highest accuracy within the PRS group.

FIG. 9 is a flow diagram of an example process 900 of UE operations for sequentially broadcasting a PRS via multiple antenna beams of a UE according to some aspects of the present disclosure. In some implementations, process 900 may be performed by UE 115 of FIGS. 1-2 and 5 or a UE as described with reference to FIG. 10. In some other implementations, process 900 may be performed by an apparatus configured for wireless communication. For example, the apparatus may include at least one processor, and a memory coupled to the processor. The processor may be configured to perform operations of process 900. In some other implementations, process 900 may be performed or executed using a non-transitory computer-readable medium having program code recorded thereon. The program code may be program code executable by a computer for causing the computer to perform operations of process 900. In some implementations, the UE operations may be performed by a UE allocated a responder role in a PRS group.

Figure 10:
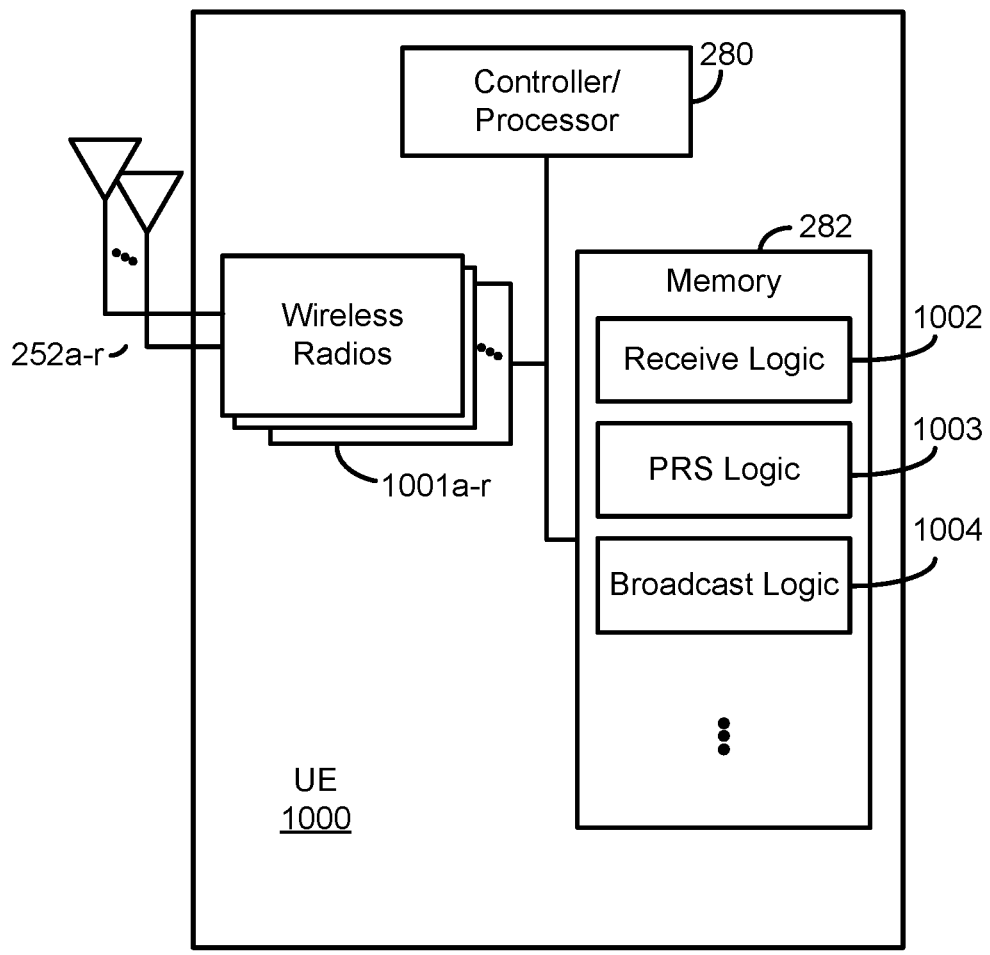
FIG. 10 is a block diagram of an example of a UE configured to sequentially broadcast a PRS via multiple antenna beams according to some aspects of the present disclosure.

Example blocks of the process 900 will also be described with respect to a UE 1000 as illustrated in FIG. 10. FIG. 10 is a block diagram illustrating an example UE 1000 configured to sequentially broadcast a PRS via multiple antenna beams according to some aspects of the present disclosure. Although described as a UE, UE 1000 may include (or be integrated within) a vehicle (or components thereof). UE 1000 includes the structure, hardware, and components as illustrated for UE 115 of FIG. 1-2 or 5. For example, UE 1000 includes controller 280, which operates to execute logic or computer instructions stored in memory 282, as well as controlling the components of UE 1000 that provide the features and functionality of UE 1000. UE 1000, under control of controller 280, transmits and receives signals via wireless radios 1001 a-r and antennas 252a-r. Wireless radios 1001a-r include various components and hardware, as illustrated in FIG. 2 for UE 115, including modulator/demodulators 254a-r, MIMO detector 256, receive processor 258, transmit processor 264, and TX MIMO processor 266.

As shown, memory 282 may include receive logic 1002, PRS logic 1003, and broadcast logic 1004. Receive logic 1002 may be configured to receive information or signaling from other devices, such as PRS group information or a PRS. PRS logic 1003 may be configured to generate a PRS signal for broadcasting to the other devices. Broadcast logic 1004 may be configured to enable broadcast of signaling or messages to the other devices, such as the PRS. UE 1000 may receive signals from or transmit signals to one or more UEs, such as UEs 530 of FIG. 5 or to one or more RSUs, such as RSU 550 of FIG. 5 or RSU 800 of FIG. 8.

Returning to process 900 described with reference to FIG. 9, as illustrated at block 902, UE 1000 receives, at a responder of a PRS group from an initiator of the PRS group, an indication of access to a wireless channel for the PRS group. To illustrate, UE 1000 may receive the indication using wireless radios 1001a-r and antennas 252a-r, and receive logic 1002. To further illustrate, UE 1000 may execute, under control of controller 280, receive logic 1002 stored in memory 282. The execution environment of receive logic 1002 provides the functionality to receive, from an initiator of a PRS group, an indication of access to a wireless channel for the PRS group.

At block 904, UE 1000 receives, from the initiator, a broadcast of a first PRS. To illustrate, UE 1000 may receive the broadcast of the first PRS using wireless radios 1001a-r and antennas 252a-r, and receive logic 1002. To further illustrate, UE 1000 may execute, under control of controller 280, receive logic 1002 stored in memory 282. The execution environment of receive logic 1002 provides the functionality to receive, from the initiator, a broadcast of a first PRS.

At block 906, UE 1000 determines whether any other member of the PRS group is scheduled for PRS broadcasts before UE 1000 (e.g., the responder). As an example of block 906, UE 1000 may execute, under control of controller 280, PRS logic 1003 stored in memory 282. The execution environment of PRS logic 1003 provides the functionality to determine PRS broadcast scheduling, such as determining whether any other member of the PRS group is scheduled for PRS broadcasts before UE 1000.

At block 908, UE 1000 broadcasts, via each antenna beam of one or more antenna beams, a second PRS based on a determination that no other member of the PRS group is scheduled for broadcasts before UE 1000 (e.g., the responder). An antenna array of UE 1000 is configured to communicate via the one or more antenna beams. To illustrate, UE 1000 may broadcast the second PRS using wireless radios 1001a-r and antennas 252a-r (e.g., an antenna array), and PRS logic 1003 and broadcast logic 1004. To further illustrate, UE 1000 may execute, under control of controller 280, PRS logic 1003 and broadcast logic 1004 stored in memory 282. The execution environment of PRS logic 1003 provides the functionality to generate a second PRS for broadcasting and set one or more parameters associated with the broadcasting, such as a sequence and a cyclic shift, as non-limiting examples. The execution environment of broadcast logic 1004 provides the functionality to broadcast, via each antenna beam of one or more antenna beams, a second PRS based on a determination that no other member of the PRS group is scheduled for broadcasts before UE 1000.

In some implementations, the responder may include or correspond to a UE. Alternatively, the responder may include or correspond to an RSU. Additionally or alternatively, broadcasting the second PRS via each antenna beam of the one or more antenna beams may include sequentially broadcasting the second PRS via each antenna beam of the one or more antenna beams. Additionally or alternatively, process 900 may also include using the same sequence for each broadcast of the second PRS. Additionally or alternatively, process 900 may further include applying a different cyclic shift to each broadcast of the second PRS. Additionally or alternatively, broadcasting the second PRS may include communicating in the mmWave band. Additionally or alternatively, each antenna beam of the one or more antenna beams may be associated with an at least partially different direction. Additionally or alternatively, UE 1000 may include a vehicle or a component of a vehicle.

In some implementations, process 900 further includes receiving, from the initiator, a PRS broadcast sequence associated with the PRS group and a number of antenna beams corresponding to each member of the PRS group. The PRS broadcast sequence may indicate a sequence in which members of the PRS group are designated to broadcast corresponding PRS signals. In some such implementations, determining whether any other member of the PRS group is scheduled for PRS broadcasts before UE 1000 may include determining whether a most recently received PRS broadcast is received from a particular member of the PRS group that is immediately before UE 1000 in the PRS broadcast sequence. In some such implementations, determining whether any other member of the PRS group is scheduled for PRS broadcasts before UE 1000 may further include determining whether the particular member has completed PRS broadcasting based on a cyclic shift associated with the most recently received PRS broadcast and a number of antenna beams associated with the particular member.

In some implementations, process 900 also includes receiving timing information from the initiator after receipt of corresponding PRS broadcasts from each remaining member of the PRS group. In some such implementations, the timing information from the initiator may include transmission times for each broadcast of the first PRS, first antenna beam information indicating antenna beams of the initiator corresponding to each broadcast of the second PRS, a receipt time of a broadcast of the second PRS at the initiator, and second antenna beam information indicating the antenna beam corresponding to receipt of the broadcast of the second PRS at the initiator. In some such implementations, process 900 may further include determining position data indicating an estimated position of UE 1000 based on the timing information, a receipt time of the broadcast of the first PRS, and a transmission time of the broadcast of the second PRS via the antenna beam indicated by the second antenna beam information, and transmitting the position data to the initiator. Additionally or alternatively, process 900 may also include determining a measured clock error noise standard deviation at UE 1000, a clock drift standard deviation at UE 1000, or both, and transmitting the measured clock error noise standard deviation, the clock drift standard deviation, or both, to the initiator. Additionally or alternatively, process 900 may also include determining an innovation measurement associated with PRS measurements at UE 1000, and transmitting the innovation measurement to the initiator.

In some implementations, process 900 further includes transmitting timing information to the initiator after receipt of a corresponding PRS broadcast from each remaining member of the PRS group. The timing information may indicate a receipt time of the broadcast of the first PRS, antenna beam information indicating an antenna beam corresponding to the broadcast of the first PRS, transmission times of the broadcasts of the second PRS, and second antenna beam information indicating the antenna beams corresponding to the broadcasts of the second PRS. In some such implementations, process 900 may also include receiving position data from the initiator. The position data may indicate an estimated position of UE 1000. In some such implementations, process 900 may also include determining speed information associated with UE 1000, and transmitting the speed information to the initiator prior to receipt of the position data. Additionally or alternatively, process 900 may also include determining a measured clock error noise standard deviation at UE 1000, a clock drift standard deviation at UE 1000, or both, and transmitting the measured clock error noise standard deviation, the clock drift standard deviation, or both, to the initiator prior to receipt of the position data. Additionally or alternatively, process 900 may also include determining an innovation measurement associated with PRS measurements at UE 1000, and transmitting the innovation measurement to the initiator prior to receipt of the position data. Additionally or alternatively, process 900 may also include receiving clock information from the initiator. The clock information may indicate a clock signal to be used by UE 1000.

In some implementations, process 900 further includes transmitting, to the initiator, a number of antenna beams included in the one or more antenna beams. Additionally or alternatively, process 900 may also include receiving, from the initiator, an indication of a CoT for the PRS group on the wireless channel. The CoT may be based on a total number of antenna beams used by all members of the PRS group.

In some implementations, roles in the PRS group are assigned via higher layer signaling between members of the PRS group. Additionally or alternatively, an initiator role in the PRS group may be assigned to an RSU located at a particular location. Additionally or alternatively, an initiator role in the PRS group may be assigned to a particular member of the PRS group based on the particular member having a fixed position or perfect knowledge of a position. In some such implementations, the initiator includes the RSU or a PRS anchor vehicle. Additionally or alternatively, an initiator role in the PRS group may be assigned to a particular member of the PRS group having a largest coverage area within the PRS group. Additionally or alternatively, an initiator role in the PRS group may be assigned to a particular member in the PRS group based on a determined position of the particular member having a highest accuracy within the PRS group. Additionally or alternatively, an initiator role in the PRS group may be assigned to a particular member in the PRS group based on an estimated position of the particular member having a highest accuracy within the PRS group.

It is noted that one or more blocks (or operations) described with reference to FIGS. 7 and 9 may be combined with one or more blocks (or operations) of another figure. For example, one or more blocks (or operations) of FIG. 7 may be combined with one or more blocks (or operations) FIG. 9. As another example, one or more blocks of FIG. 7 or 9 may be combined with one or more blocks (or operations) of another of FIG. 2, 3, or 5. Additionally, or alternatively, one or more operations described above with reference to FIGS. 1-9 may be combined with one or more operations described with reference to FIG. 10.

In some aspects of the present disclosure, techniques for enabling positioning of vehicles using mmWave PRSs may include additional aspects, such as any single aspect or any combination of aspects described below or in connection with one or more other processes or devices described elsewhere herein. In some aspects of the present disclosure, enabling positioning of vehicles using mmWave PRSs may include an apparatus transmitting, from an initiator of a PRS group to other members of the PRS group, an indication of access to a wireless channel for the PRS group. The apparatus may also broadcast a first PRS via each antenna beam of a plurality of antenna beams. An antenna array of the initiator may be configured to communicate via the plurality of antenna beams. In some implementations, the apparatus (e.g., the initiator) includes a wireless device, such as a RSU or a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the initiator includes an RSU.

In a second aspect, the initiator includes a UE.

In a third aspect, broadcasting the first PRS via each antenna beam of the plurality of antenna beams includes sequentially broadcasting the first PRS via each antenna beam of the plurality of antenna beams.

In a fourth aspect, alone or in combination with one or more of the first through third aspects, the apparatus uses the same sequence for each broadcast of the first PRS.

In a fifth aspect, alone or in combination with one or more of the first through fourth aspects, the apparatus applies a different cyclic shift to the each broadcast of the first PRS.

In a sixth aspect, alone or in combination with one or more of the first through fifth aspects, broadcasting the first PRS comprises communicating in the mmWave band.

In a seventh aspect, alone or in combination with one or more of the first through sixth aspects, each antenna beam of the plurality of antenna beams is associated with an at least partially different direction.

In an eighth aspect, alone or in combination with one or more of the first through seventh aspects, the apparatus receives a broadcast of a second PRS from a wireless communication device allocated a responder role in the PRS group.

In a ninth aspect, in combination with the eighth aspect, the wireless communication device comprises a vehicle or a component of a vehicle.

In a tenth aspect, alone or in combination with one or more of the eighth through ninth aspects, the apparatus transmits timing information to the wireless communication device after receipt of a corresponding PRS broadcast from each remaining member included in the PRS group.

In an eleventh aspect, in combination with the tenth aspect, the timing information comprises transmission times for each broadcast of the first PRS, first antenna beam information indicating the antenna beams corresponding to each broadcast of the first PRS, a receipt time of the broadcast of the second PRS, and second antenna beam information indicating an antenna beam corresponding to receipt of the broadcast of the second PRS.

In a twelfth aspect, alone or in combination with one or more of the tenth through eleventh aspects, the apparatus receives position data from the wireless communication device. The position data is based, at least in part, on the timing information.

In a thirteenth aspect, in combination with the twelfth aspect, the apparatus determines a measured clock error noise standard deviation at the initiator, a clock drift standard deviation at the initiator, or both, and transmits the measured clock error noise standard deviation, the clock drift standard deviation, or both, to the wireless communication device prior to receipt of the position data.

In an fourteenth aspect, alone or in combination with one or more of the twelfth through thirteenth aspects, the apparatus determines an innovation measurement associated with PRS measurements at the initiator, and transmits the innovation measurement to the wireless communication device prior to receipt of the position data.

In a fifteenth aspect, alone or in combination with one or more of the eighth through ninth aspects, the apparatus receives timing information from the wireless communication device after receipt of corresponding PRS broadcasts from each remaining member of the PRS group, determines position data indicating an estimated position of the wireless communication device based on the timing information, a transmission time for the broadcast of the first PRS via an antenna beam indicated by the timing information, and a receipt time of the broadcast of the second PRS, and transmits the position data to the wireless communication device.

In a sixteenth aspect, in combination with the fifteenth aspect, the apparatus determines clock information for the wireless communication device based on a clock signal of the initiator and the timing information, and transmits the clock information to the wireless communication device.

In a seventeenth aspect, alone or in combination with one or more of the fifteenth through sixteenth aspects, the timing information from the wireless communication device comprises a receipt time of a broadcast of the first PRS at the wireless communication device, antenna beam information indicating the antenna beam corresponding to receipt of the broadcast of the first PRS at the wireless communication device, transmission times for one or more broadcasts of the second PRS by the wireless communication device, and second antenna beam information indicating antenna beams corresponding to broadcast of the second PRS.

In an eighteenth aspect, alone or in combination with one or more of the fifteenth through seventeenth aspects, the apparatus receives speed information from the wireless communication device. The position data is further based on the speed information.

In a nineteenth aspect, alone or in combination with one or more of the fifteenth through eighteenth aspects, the apparatus receives, from the wireless communication device, a measured clock error noise standard deviation at the wireless communication device, a clock drift standard deviation at the wireless communication device, or both. The position data is further based on the measured clock error noise standard deviation, the clock drift standard deviation, or both.

In a twentieth aspect, alone or in combination with one or more of the fifteenth through nineteenth aspects, the apparatus receives, from the wireless communication device, an innovation measurement associated with PRS measurements at the wireless communication device. The position data is further based on the innovation measurement.

In twenty-first aspect, alone or in combination with one or more of the first through twentieth aspects, the apparatus transmits, to other members of the PRS group, a PRS broadcast sequence associated with the PRS group. The PRS broadcast sequence indicates a sequence in which members of the PRS group are designated to broadcast corresponding PRS signals.

In a twenty-second aspect, alone or in combination with one or more of the first through twenty-first aspects, the apparatus receives, from a member of the PRS group, a number of antenna beams used by the member of the PRS group.

In a twenty-third aspect, in combination with the twenty-second aspect, the apparatus transmits, to other members of the PRS group, an indication of a CoT for the PRS group on the wireless channel. The CoT is based on a total number of antenna beams used by all members of the PRS group.

In a twenty-fourth aspect, alone or in combination with one or more of the first through twenty-third aspects, roles in the PRS group are assigned via higher layer signaling between members of the PRS group.

In a twenty-fifth aspect, alone or in combination with one or more of the first through twenty-fourth aspects, an initiator role in the PRS group is assigned to an RSU located at a particular location.

In a twenty-sixth aspect, alone or in combination with one or more of the first through twenty-fifth aspects, an initiator role in the PRS group is assigned to a particular member of the PRS group based on the particular member having a fixed position or perfect knowledge of a position.

In a twenty-seventh aspect, in combination with the twenty-sixth aspect, the initiator comprises an RSU or a PRS anchor vehicle.

In a twenty-eighth aspect, alone or in combination with one or more of the first through twenty-seventh aspects, an initiator role in the PRS group is assigned to a particular member of the PRS group having a largest coverage area within the PRS group.

In a twenty-ninth aspect, alone or in combination with one or more of the first through twenty-eighth aspects, an initiator role in the PRS group is assigned to a particular member in the PRS group based on a determined position of the particular member having a highest accuracy within the PRS group.

In a thirtieth aspect, alone or in combination with one or more of the first through twenty-ninth aspects, an initiator role in the PRS group is assigned to a particular member in the PRS group based on an estimated position of the particular member having a highest accuracy within the PRS group.

In some aspects of the present disclosure, an apparatus configured for wireless communication is configured to receive, at a responder of a PRS group from an initiator of the PRS group, an indication of access to a wireless channel for the PRS group. The apparatus is also configured to receive, from the initiator, a broadcast of a first PRS. The apparatus is also configured to determine whether any other member of the PRS group is scheduled for PRS broadcasts before the responder. The apparatus is further configured to broadcast, via each antenna beam of one or more antenna beams, a second PRS based on a determination that no other member of the PRS group is scheduled for broadcasts before the responder. An antenna array of the responder may be configured to communicate via the one or more antenna beams. In some implementations, the apparatus (e.g., the responder) includes a wireless device, such as a UE or an RSU. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a thirty-first aspect, the responder includes a UE.

In a thirty-second aspect, the responder includes an RSU.

In a thirty-third aspect, alone or in combination with one or more of the thirty-first through thirty-second aspects, broadcasting the second PRS via each antenna beam of the one or more antenna beams includes sequentially broadcasting the second PRS via each antenna beam of the one or more antenna beams.

In a thirty-fourth aspect, alone or in combination with one or more of the thirty-first through thirty-third aspects, the apparatus uses the same sequence for each broadcast of the second PRS.

In a thirty-fifth aspect, alone or in combination with one or more of the thirty-first through thirty fourth aspects, the apparatus applies a different cyclic shift to each broadcast of the second PRS.

In a thirty-sixth aspect, alone or in combination with one or more of the thirty-first through thirty-fifth aspects, broadcasting the second PRS comprises communicating in the mmWave band.

In a thirty-seventh aspect, alone or in combination with one or more of the thirty-first through thirty-sixth aspects, each antenna beam of the one or more antenna beams is associated with an at least partially different direction.

In a thirty-eighth aspect, alone or in combination with one or more of the thirty-first through thirty-seventh aspects, the initiator comprises an RSU.

In a thirty-ninth aspect, alone or in combination with one or more of the thirty-first through thirty-eighth aspects, the apparatus receives, from the initiator, a PRS broadcast sequence associated with the PRS group and a number of antenna beams corresponding to each member of the PRS group. The PRS broadcast sequence indicates a sequence in which members of the PRS group are designated to broadcast corresponding PRS signals.

In a fortieth aspect, in combination with the thirty-ninth aspect, determining whether any other member of the PRS group is scheduled for PRS broadcasts before the responder comprises determining whether a most recently received PRS broadcast is received from a particular member of the PRS group that is immediately before the responder in the PRS broadcast sequence.

In a forty-first aspect, in combination with the fortieth aspect, determining whether any other member of the PRS group is scheduled for PRS broadcasts before the responder further comprises determining whether the particular member has completed PRS broadcasting based on a cyclic shift associated with the most recently received PRS broadcast and a number of antenna beams associated with the particular member.

In a forty-second aspect, alone or in combination with one or more of the thirty-first through forty-first aspects, the apparatus receives timing information from the initiator after receipt of corresponding PRS broadcasts from each remaining member of the PRS group.

In a forty-third aspect, in combination with the forty-second aspect, the timing information from the initiator comprises transmission times for each broadcast of the first PRS, first antenna beam information indicating antenna beams of the initiator corresponding to each broadcast of the second PRS, a receipt time of a broadcast of the second PRS at the initiator, and second antenna beam information indicating the antenna beam corresponding to receipt of the broadcast of the second PRS at the initiator.

In a forty-fourth aspect, in combination with the forty-third aspect, the apparatus determines position data indicating an estimated position of the responder based on the timing information, a receipt time of the broadcast of the first PRS, and a transmission time of the broadcast of the second PRS via the antenna beam indicated by the second antenna beam information, and transmits the position data to the initiator.

In a forty-fifth aspect, alone or in combination with one or more of the forty-third through forth-fourth aspects, the apparatus determines a measured clock error noise standard deviation at the responder, a clock drift standard deviation at the responder, or both, and transmits the measured clock error noise standard deviation, the clock drift standard deviation, or both, to the initiator.

In a forty-sixth aspect, alone or in combination with one or more of the forty-third through forty-fifth aspects, the apparatus determines an innovation measurement associated with PRS measurements at the responder, and transmits the innovation measurement to the initiator.

In a forty-seventh aspect, alone or in combination with one or more of the thirty-first through forty-first aspects, the apparatus transmits timing information to the initiator after receipt of a corresponding PRS broadcast from each remaining member of the PRS group. The timing information indicates a receipt time of the broadcast of the first PRS, antenna beam information indicating an antenna beam corresponding to the broadcast of the first PRS, transmission times of the broadcasts of the second PRS, and second antenna beam information indicating the antenna beams corresponding to the broadcasts of the second PRS.

In a forty-eighth aspect, in combination with the forty-seventh aspect, the apparatus receives position data from the initiator. The position data indicates an estimated position of the responder.

In a forty-ninth aspect, in combination with the forty-eighth aspect, the apparatus determines speed information associated with the responder, and transmits the speed information to the initiator prior to receipt of the position data.

In a fiftieth aspect, alone or in combination with one or more of the forty-eighth through forty-ninth aspects, the apparatus determines a measured clock error noise standard deviation at the responder, a clock drift standard deviation at the responder, or both, and transmits the measured clock error noise standard deviation, the clock drift standard deviation, or both, to the initiator prior to receipt of the position data.

In a fifty-first aspect, alone or in combination with one or more of the forty-eighth through fiftieth aspects, the apparatus determines an innovation measurement associated with PRS measurements at the responder, and transmits the innovation measurement to the initiator prior to receipt of the position data.

In a fifty-second aspect, alone or in combination with one or more of the forty-eighth through fifty-first aspects, the apparatus receives clock information from the initiator. The clock information indicates a clock signal to be used by the responder.

In a fifty-third aspect, alone or in combination with one or more of the thirty-first through fifty-second aspects, the apparatus transmits, to the initiator, a number of antenna beams included in the one or more antenna beams.

In a fifty-fourth aspect, in combination with the fifty third aspect, the apparatus receives, from the initiator, an indication of a CoT for the PRS group on the wireless channel. The CoT is based on a total number of antenna beams used by all members of the PRS group.

In a fifty-fifth aspect, alone or in combination with one or more of the thirty-first through fifty-fourth aspects, roles in the PRS group are assigned via higher layer signaling between members of the PRS group.

In a fifty-sixth aspect, alone or in combination with one or more of the thirty-first through fifty-fifth aspects, an initiator role in the PRS group is assigned to an RSU located at a particular location.

In a fifty-seventh aspect, alone or in combination with one or more of the thirty-first through fifty-sixth aspects, an initiator role in the PRS group is assigned to a particular member of the PRS group based on the particular member having a fixed position or perfect knowledge of a position.

In a fifty-eighth aspect, in combination with the fifty-seventh aspect, the initiator comprises an RSU or a PRS anchor vehicle.

In a fifty-ninth aspect, alone or in combination with one or more of the thirty-first through fifty-eighth aspects, an initiator role in the PRS group is assigned to a particular member of the PRS group having a largest coverage area within the PRS group.

In a sixtieth aspect, alone or in combination with one or more of the thirty-first through fifty-ninth aspects, an initiator role in the PRS group is assigned to a particular member in the PRS group based on a determined position of the particular member having a highest accuracy within the PRS group.

In a sixty-first aspect, alone or in combination with one or more of the thirty-first through sixtieth aspects, an initiator role in the PRS group is assigned to a particular member in the PRS group based on an estimated position of the particular member having a highest accuracy within the PRS group.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Additionally, the use of "positioning reference signal" or "PRS" herein, unless otherwise stated, is intended to represent all or part of one or more signals that may be used, at least in part, for positioning purposes such as position determination or estimation, or other examples. As such, a person of ordinary skill in the art will recognize that, unless otherwise stated, a PRS as used herein need not necessarily be confined to represent a particular signal or message scheme in a given communications standard or the like.

Components, the functional blocks, and modules described herein (e.g., the components, functional blocks, and modules in FIGS. 2, 5, 8, and 10) may comprise processors, electronics devices, hardware devices, electronics components, logical circuits, memories, software codes, firmware codes, etc., or any combination thereof. In addition, features discussed herein relating to FIGS. 1-10 may be implemented via specialized processor circuitry, via executable instructions, or combinations thereof.

Those of skill would further appreciate that the various illustrative logical blocks, modules, circuits, and algorithm steps (e.g., the logical blocks in FIGS. 7 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
transmitting, from an initiator of a positioning reference signal (PRS) group to other members of the PRS group, an indication of access to a wireless channel for the PRS group; and
broadcasting a first PRS via each antenna beam of a plurality of antenna beams, wherein an antenna array of the initiator is configured to communicate via the plurality of antenna beams.

2. The method of claim 1, wherein broadcasting the first PRS via each antenna beam of the plurality of antenna beams comprises sequentially broadcasting the first PRS via each antenna beam of the plurality of antenna beams.

3. The method of claim 1, further comprising using the same sequence for each broadcast of the first PRS.

4. The method of claim 1, further comprising applying a different cyclic shift to each broadcast of the first PRS.

5. The method of claim 1, further comprising:
receiving a broadcast of a second PRS from a wireless communication device allocated a responder role in the PRS group, the wireless communication device comprising a vehicle or a component of a vehicle; and
transmitting timing information to the wireless communication device after receipt of a corresponding PRS broadcast from each remaining member included in the PRS group.

6. The method of claim 5, wherein the timing information comprises transmission times for each broadcast of the first PRS, first antenna beam information indicating the antenna beams corresponding to each broadcast of the first PRS, a receipt time of the broadcast of the second PRS, and second antenna beam information indicating an antenna beam corresponding to receipt of the broadcast of the second PRS.

7. The method of claim 5, further comprising receiving position data from the wireless communication device, the position data being based, at least in part, on the timing information.

8. The method of claim 7, further comprising:
determining a measured clock error noise standard deviation at the initiator, a clock drift standard deviation at the initiator, or both; and
transmitting the measured clock error noise standard deviation, the clock drift standard deviation, or both, to the wireless communication device prior to receipt of the position data.

9. The method of claim 7, further comprising:
determining an innovation measurement associated with PRS measurements at the initiator; and transmitting the innovation measurement to the wireless communication device prior to receipt of the position data.

10. The method of claim 1, further comprising transmitting, to the other members of the PRS group, a PRS broadcast sequence associated with the PRS group, the PRS broadcast sequence indicating a sequence in which members of the PRS group are designated to broadcast corresponding PRS signals.

11. The method of claim 1, further comprising:
receiving, from a member of the PRS group, a number of antenna beams used by the member of the PRS group; and
transmitting, to the other members of the PRS group, an indication of a channel occupancy time (CoT) for the PRS group on the wireless channel, the CoT based on a total number of antenna beams used by all members of the PRS group.

12. The method of claim 1, wherein an initiator role in the PRS group is assigned to a particular member of the PRS group based on:
the particular member being a roadside unit (RSU) located at a particular location;
the particular member having a fixed position or perfect knowledge of a position;
the particular member having a largest coverage area within the PRS group;
a determined position of the particular member having a highest accuracy within the PRS group; or
an estimated position of the particular member having a highest accuracy within the PRS group.

13. An apparatus configured for wireless communication, the apparatus comprising:
at least one processor; and
a memory coupled to the at least one processor,
wherein the at least one processor is configured to:
transmit, from an initiator of a positioning reference signal (PRS) group to other members of the PRS group, an indication of access to a wireless channel for the PRS group; and
broadcast a first PRS via each antenna beam of a plurality of antenna beams, wherein an antenna array of the initiator is configured to communicate via the plurality of antenna beams.

14. The apparatus of claim 13, wherein each antenna beam of the plurality of antenna beams is associated with an at least partially different direction.

15. The apparatus of claim 13, wherein the at least one processor is further configured to:
receive a broadcast of a second PRS from a wireless communication device allocated a responder role in the PRS group;
receive timing information from the wireless communication device after receipt of a corresponding PRS broadcast from each remaining member of the PRS group;
determine position data indicating an estimated position of the wireless communication device based on the timing information, a transmission time for the broadcast of the first PRS via an antenna beam indicated by the timing information, and a receipt time of the broadcast of the second PRS; and
transmit the position data to the wireless communication device.

16. The apparatus of claim 15, wherein the at least one processor is further configured to:
determine clock information for the wireless communication device based on a clock signal of the initiator and the timing information; and
transmit the clock information to the wireless communication device.

17. The apparatus of claim 15, wherein the timing information from the wireless communication device comprises a receipt time of a broadcast of the first PRS at the wireless communication device, antenna beam information indicating the antenna beam corresponding to receipt of the broadcast of the first PRS at the wireless communication device, transmission times for one or more broadcasts of the second PRS by the wireless communication device, and second antenna beam information indicating at least one antenna beam corresponding to broadcast of the second PRS.

18. The apparatus of claim 15, wherein the at least one processor is further configured to receive speed information from the wireless communication device, and wherein the position data is further based on the speed information.

19. The apparatus of claim 15, wherein the at least one processor is further configured to receive, from the wireless communication device, a measured clock error noise standard deviation at the wireless communication device, a clock drift standard deviation at the wireless communication device, or both, and wherein the position data is further based on the measured clock error noise standard deviation, the clock drift standard deviation, or both.

20. The apparatus of claim 15, wherein the at least one processor is further configured to receive, from the wireless communication device, an innovation measurement associated with PRS measurements at the wireless communication device, and wherein the position data is further based on the innovation measurement.

21. A method of wireless communication, the method comprising:
receiving, at a responder of a positioning reference signal (PRS) group from an initiator of the PRS group, an indication of access to a wireless channel for the PRS group;
receiving, from the initiator, a broadcast of a first PRS;
determining whether any other member of the PRS group is scheduled for PRS broadcasts before the responder; and
broadcasting, via each antenna beam of one or more antenna beams, a second PRS based on a determination that no other member of the PRS group is scheduled for broadcasts before the responder, wherein an antenna array of the responder is configured to communicate via the one or more antenna beams.

22. The method of claim 21, wherein broadcasting the second PRS via each antenna beam of the one or more antenna beams comprises sequentially broadcasting the second PRS via each antenna beam of the one or more antenna beams, and wherein broadcasting the second PRS comprises communicating in the millimeter-wave (mmWave) band.

23. The method of claim 21, further comprising:
using the same sequence for each broadcast of the second PRS; or
applying a different cyclic shift to each broadcast of the second PRS.

24. The method of claim 21, further comprising receiving, from the initiator, a PRS broadcast sequence associated with the PRS group and a number of antenna beams corresponding to each member of the PRS group, the PRS broadcast sequence indicating a sequence in which members of the PRS group are designated to broadcast corresponding PRS signals.

25. The method of claim 24, wherein determining whether any other member of the PRS group is scheduled for PRS broadcasts before the responder comprises:
 determining whether a most recently received PRS broadcast is received from a particular member of the PRS group that is immediately before the responder in the PRS broadcast sequence; and
 determining whether the particular member has completed PRS broadcasting based on a cyclic shift associated with the most recently received PRS broadcast and a number of antenna beams associated with the particular member.

26. An apparatus configured for wireless communication, the apparatus comprising:
 at least one processor; and
 a memory coupled to the at least one processor,
 wherein the at least one processor is configured to:
  receive, at a responder of a positioning reference signal (PRS) group from an initiator of the PRS group, an indication of access to a wireless channel for the PRS group;
  receive, from the initiator, a broadcast of a first PRS;
  determine whether any other member of the PRS group is scheduled for PRS broadcasts before the responder; and
  broadcast, via each antenna beam of one or more antenna beams, a second PRS based on a determination that no other member of the PRS group is scheduled for broadcasts before the responder, wherein an antenna array of the responder is configured to communicate via the one or more antenna beams.

27. The apparatus of claim 26, wherein the at least one processor is further configured to:
 receive timing information from the initiator after receipt of corresponding PRS broadcasts from each remaining member of the PRS group, the timing information from the initiator comprising transmission times for each broadcast of the first PRS, first antenna beam information indicating antenna beams of the initiator corresponding to each broadcast of the second PRS, a receipt time of a broadcast of the second PRS at the initiator, and second antenna beam information indicating the antenna beam corresponding to receipt of the broadcast of the second PRS at the initiator;
 determine position data indicating an estimated position of the responder based on the timing information, a receipt time of the broadcast of the first PRS, and a transmission time of the broadcast of the second PRS via the antenna beam indicated by the second antenna beam information; and
 transmit the position data to the initiator.

28. The apparatus of claim 26, wherein the at least one processor is further configured to:
 initiate transmission of timing information to the initiator after receipt of a corresponding PRS broadcast from each remaining member of the PRS group, the timing information indicating a receipt time of the broadcast of the first PRS, antenna beam information indicating an antenna beam corresponding to the broadcast of the first PRS, transmission times of the broadcasts of the second PRS, and second antenna beam information indicating the antenna beams corresponding to the broadcasts of the second PRS;
 receive position data from the initiator, the position data indicating an estimated position of the responder;
 determine speed information associated with the responder, a measured clock error noise standard deviation at the responder, a clock drift standard deviation at the responder, an innovation measurement associated with PRS measurements at the responder, or a combination thereof; and
 initiate transmission of the speed information, the measured clock error noise standard deviation, the clock drift standard deviation, the innovation measurement, or a combination thereof, to the initiator prior to receipt of position data from the initiator.

29. The apparatus of claim 26, wherein the at least one processor is further configured to:
 initiate transmission, to the initiator, of a number of antenna beams included in the one or more antenna beams; and
 receive, from the initiator, an indication of a channel occupancy time (CoT) for the PRS group on the wireless channel, the CoT based on a total number of antenna beams used by all members of the PRS group.

30. The method of claim 1, further comprising:
 transmitting timing information after receipt of corresponding PRS broadcasts from each remaining member of the PRS group, the timing information comprising transmission times for each broadcast of the first PRS, first antenna beam information indicating antenna beams corresponding to each broadcast of a second PRS from a wireless communicating device allocated a responder role in the PRS group, a receipt time of a broadcast of the second PRS, and second antenna beam information indicating the antenna beam corresponding to receipt of the broadcast of the second PRS.

* * * * *